United States Patent
Lee et al.

(10) Patent No.: US 10,666,936 B2
(45) Date of Patent: May 26, 2020

(54) VIDEO DECODING METHOD AND VIDEO DECODING APPARATUS USING MERGE CANDIDATE LIST

(71) Applicant: SAMSUNG ELECTRONICS CO., LTD., Suwon-si (KR)

(72) Inventors: Jin-young Lee, Suwon-si (KR); Ki-ho Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 73 days.

(21) Appl. No.: 15/780,047

(22) PCT Filed: Dec. 15, 2016

(86) PCT No.: PCT/KR2016/014695
§ 371 (c)(1),
(2) Date: May 30, 2018

(87) PCT Pub. No.: WO2017/105097
PCT Pub. Date: Jun. 22, 2017

(65) Prior Publication Data
US 2018/0359470 A1     Dec. 13, 2018

Related U.S. Application Data

(60) Provisional application No. 62/268,784, filed on Dec. 17, 2015.

(51) Int. Cl.
*H04N 19/11*     (2014.01)
*H04N 19/50*     (2014.01)
(Continued)

(52) U.S. Cl.
CPC ......... *H04N 19/105* (2014.11); *H04N 19/109* (2014.11); *H04N 19/139* (2014.11);
(Continued)

(58) Field of Classification Search
CPC .. H04N 19/105; H04N 19/139; H04N 19/198; H04N 19/56; H04N 19/176;
(Continued)

(56) References Cited

U.S. PATENT DOCUMENTS 8,867,620 B2 * 10/2014 Sugio .................... H04N 19/51
  375/240.16
9,338,460 B2   5/2016 Oh et al.
(Continued)

FOREIGN PATENT DOCUMENTS

JP   2015-180075 A   10/2015
JP   5823628 B2      11/2015
(Continued)

OTHER PUBLICATIONS

International Search Report (PCT/ISA/210) and Written Opinion (PCT/ISA/237) dated Mar. 16, 2017 issued by the International Searching Authority in International Application No. PCT/KR2016/014695.

*Primary Examiner* — Philip P. Dang
(74) *Attorney, Agent, or Firm* — Sughrue Mion, PLLC

(57) ABSTRACT

According to an embodiment, a video encoding method includes: determining whether it is possible to include an intra merge candidate in a merge candidate list; when it is possible to include the intra merge candidate in the merge candidate list, determining a merge candidate list including at least one of the intra merge candidate and an intra merge candidate of a current block; generating prediction samples of the current block by using a prediction candidate selected from the determined merge candidate list; and reconstructing the current block by using residual samples between the current blocks and the prediction samples of the current block.

13 Claims, 22 Drawing Sheets

(51) Int. Cl.
*H04N 19/174* (2014.01)
*H04N 19/105* (2014.01)
*H04N 19/176* (2014.01)
*H04N 19/159* (2014.01)
*H04N 19/109* (2014.01)
*H04N 19/513* (2014.01)
*H04N 19/139* (2014.01)
*H04N 19/196* (2014.01)
*H04N 19/56* (2014.01)

(52) U.S. Cl.
CPC ......... *H04N 19/159* (2014.11); *H04N 19/176* (2014.11); *H04N 19/198* (2014.11); *H04N 19/513* (2014.11); *H04N 19/56* (2014.11)

(58) Field of Classification Search
CPC .. H04N 19/513; H04N 19/159; H04N 19/109; H04N 19/11; H04N 19/44; H04N 19/51
See application file for complete search history.

(56) References Cited

U.S. PATENT DOCUMENTS

| | | | |
|---|---|---|---|
| 9,571,852 B2 | 2/2017 | Lim et al. | |
| 9,578,348 B2 | 2/2017 | Lee et al. | |
| 9,609,347 B2* | 3/2017 | Thirumalai | H04N 19/597 |
| 9,756,350 B2* | 9/2017 | Chuang | H04N 19/503 |
| 9,756,354 B2* | 9/2017 | Pang | H04N 19/513 |
| 9,854,237 B2* | 12/2017 | Pang | H04N 19/105 |
| 9,924,181 B2* | 3/2018 | Chuang | H04N 19/51 |
| 10,412,387 B2* | 9/2019 | Pang | H04N 19/176 |
| 2014/0071235 A1* | 3/2014 | Zhang | H04N 19/597 |
| | | | 348/43 |
| 2014/0269916 A1* | 9/2014 | Lim | H04N 19/577 |
| | | | 375/240.15 |
| 2014/0301467 A1 | 10/2014 | Thirumalai et al. | |
| 2015/0237370 A1 | 8/2015 | Zhou et al. | |
| 2015/0271487 A1* | 9/2015 | Li | H04N 19/105 |
| | | | 375/240.02 |
| 2015/0271515 A1* | 9/2015 | Pang | H04N 19/70 |
| | | | 375/240.16 |
| 2015/0281708 A1* | 10/2015 | Chuang | H04N 19/52 |
| | | | 375/240.02 |
| 2016/0073133 A1* | 3/2016 | Lee | H04N 19/52 |
| | | | 375/240.12 |
| 2016/0134891 A1* | 5/2016 | Lee | H04N 19/597 |
| | | | 375/240.08 |

FOREIGN PATENT DOCUMENTS

| | | |
|---|---|---|
| KR | 10-2015-0122106 A | 10/2015 |
| KR | 10-2015-0138309 A | 12/2015 |
| WO | 2014/003367 A1 | 1/2014 |

\* cited by examiner

FIG. 9

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   if( slice_type != I && !cu_skip_flag[ x0 ][ y0 ] ) | |
|     cu_intra_skip_flag[ x0 ][ y0 ] | ae(v) |
|   nCbS = ( 1 << log2CbSize ) | |
|   if( cu_skip_flag[ x0 ][ y0 ] || cu_intra_skip_flag[ x0 ][ y0 ] ) | |
|     prediction_unit( x0, y0, nCbS, nCbS ) | |
|   else { | |
|     ... | |

| prediction_unit( x0, y0, nPbW, nPbH ) { | Descriptor |
|---|---|
|   if( cu_skip_flag[ x0 ][ y0 ] || cu_intra_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( !merge_flag[ x0 ][ y0 ] ) | |
|       intra_merge_flag[ x0 ][ y0 ] | ae(v) |
|     if( merge_flag[ x0 ][ y0 ] || intra_merge_flag[ x0 ][ y0 ] ) { | |
|       if( MaxNumMergeCand > 1 ) | |
|         merge_idx[ x0 ][ y0 ] | ae(v) |
|     } else { | |
|       ... | |

FIG. 11
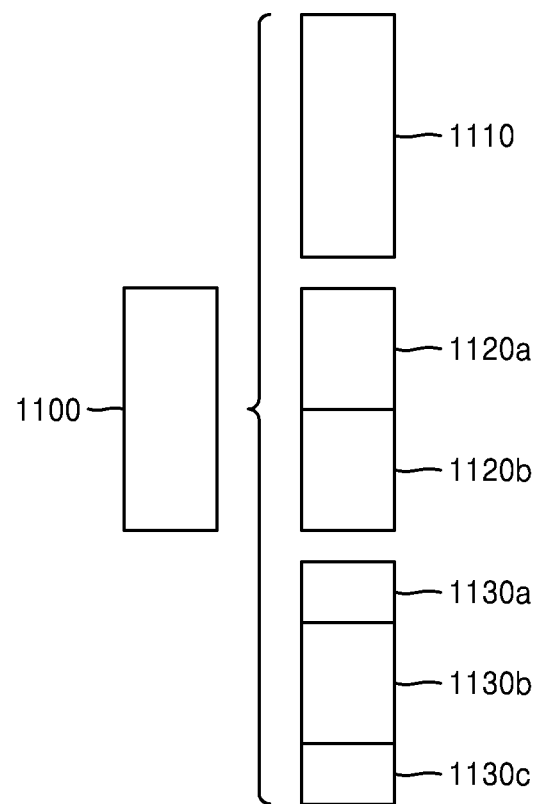
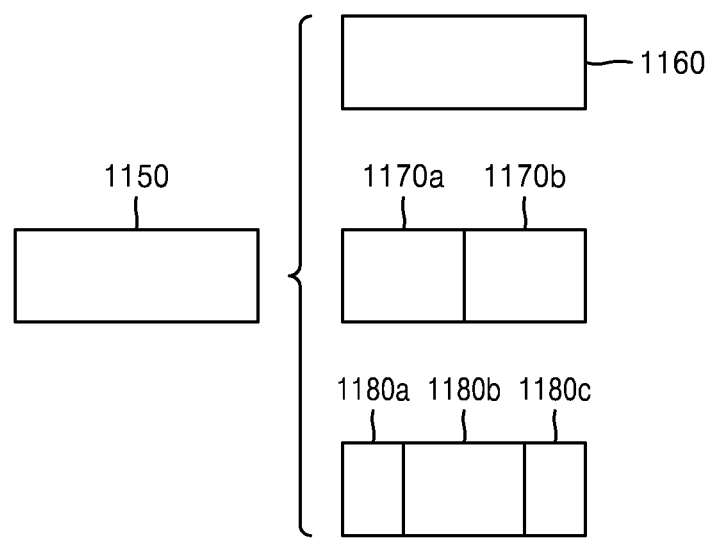

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

US 10,666,936 B2

VIDEO DECODING METHOD AND VIDEO DECODING APPARATUS USING MERGE CANDIDATE LIST

TECHNICAL FIELD

The present disclosure relates to a video decoding method and a video decoding apparatus, and more particularly, to a method and apparatus for performing inter prediction by using a merge candidate list including a temporal neighboring block and a spatial neighboring block.

BACKGROUND ART

Image data is encoded by a codec in accordance with a predetermined data compression standard, for example, the Moving Picture Expert Group (MPEG) standard, and is then stored in a recording medium in the form of a bitstream or transmitted through a communication channel.

As hardware capable of reproducing and storing high-resolution or high-definition image content is being developed and supplied, there is an increasing need for a codec for effectively encoding or decoding the high-resolution or high-definition image content. The encoded image content may be decoded and then reproduced. Recently, methods of effectively compressing such high-resolution or high-definition image content have been implemented. For example, an image compression technique may be effectively implemented through a process of dividing an image to be encoded by an arbitrary method or manipulating data.

A prediction technique is the most widely used technique for encoding a video including temporally consecutive images. In the video encoding/decoding technology, the prediction technique is a technique for encoding data of a current block by using a block having information with similar tendency to the current block in the image. If the data of the current block is directly encoded, the amount of data generated by the encoding is relatively large. Therefore, only the difference information between the data of another block that has already been encoded and the data of the current block is encoded and the data generated by the encoding is transmitted or stored.

The information generated by encoding the data of the current block through the prediction technique may be defined as prediction information. At this time, information indicating another block used to encode the current block is also encoded as prediction information and then transmitted or stored.

In the prediction technique, a process of determining another block used to encode the current block is preceded. According to the prediction technique, since the current block is predicted by using information having similar tendency to the current block, neighboring samples spatially adjacent to the current block in the current image are used, or collocated blocks in spatially adjacent neighboring blocks and temporally different images are used.

According to the intra prediction technique among the prediction techniques, the sample value of the current block may be determined using neighboring sample values spatially adjacent to the current block.

According to the inter prediction technique, as another prediction technique, motion information of the current block is determined using prediction information of the adjacent block or the neighboring block such as the collocated block. The sample value of the current block may be determined using the sample value of the reference block indicated by the motion information of the current block.

The range of the information to be referred to as the prediction information of the current block in the prediction information of the adjacent block or the collocated block may be changed according to whether a mode is a skip mode, a merge mode, or an advanced motion vector prediction (AMVP) mode among the inter prediction techniques.

In particular, in the case of the skip mode or the merge mode, a merge candidate list is used to determine a neighboring block to be used for inter prediction. The motion information of the current block may be determined using one piece of motion information among at least one candidate block included in the merge candidate list.

DESCRIPTION OF EMBODIMENTS

Technical Problem

Provided are a video encoding apparatus or a decoding apparatus, and a method of effectively determining a merge candidate list to be used for inter prediction.

Solution to Problem

According to an aspect of the present disclosure, a video encoding method includes: determining whether it is possible to include an intra merge candidate in a merge candidate list; when it is possible to include the intra merge candidate in the merge candidate list, determining a merge candidate list including at least one of the intra merge candidate and an inter merge candidate of a current block; generating prediction samples of the current block by using a prediction candidate selected from the determined merge candidate list; and reconstructing the current block by using residual samples between the current block and the prediction samples of the current block. The inter merge candidate is a prediction block determined by motion information of at least one block selected from among a neighboring block spatially adjacent to the current block and a collocated block located corresponding to a position of the current block in a picture temporally adjacent to the current block, and the intra merge candidate is a prediction block determined using neighboring samples spatially adjacent to the current block.

According to another aspect of the present disclosure, a video decoding apparatus includes: a merge candidate list determiner configured to determine whether it is possible to include an intra merge candidate in a merge candidate list, and when it is possible to include the intra merge candidate in the merge candidate list, determine a merge candidate list including at least one of the intra merge candidate and an intra merge candidate of a current block; and a decoder configured to generate prediction samples of the current block by using a prediction candidate selected from the determined merge candidate list, and reconstruct the current block by using the prediction samples of the current block and residual samples of the current block.

According to another aspect of the present disclosure, a video encoding method includes: when an intra merge candidate is included in a merge candidate list, determining a merge candidate list including at least one of an intra merge candidate and an inter merge candidate of a current block; generating a merge candidate index indicating a prediction candidate selected for generating prediction samples of the current block in the determined merge candidate list; and encoding residual samples between the current block and the prediction samples of the current block and the merge candidate index, and generating a bitstream including the encoded residual samples and merge candidate index.

According to another aspect of the present disclosure, there is provided a non-transitory computer-readable recording medium having stored thereon a computer program for performing a video decoding method including: determining whether it is possible to include an intra merge candidate in a merge candidate list; when it is possible to include the intra merge candidate in the merge candidate list, determining a merge candidate list including at least one of the intra merge candidate and an inter merge candidate of a current block; generating prediction samples of the current block by using a prediction candidate selected from the determined merge candidate list; and reconstructing the current block by using the prediction samples of the current block and residual samples of the current block.

According to another aspect of the present disclosure, there is provided a non-transitory computer-readable recording medium having stored thereon a computer program for performing a video encoding method including: when an intra merge candidate is included in a merge candidate list, determining a merge candidate list including at least one of an intra merge candidate and an inter merge candidate of a current block; generating a merge candidate index indicating a prediction candidate selected for generating prediction samples of the current block in the determined merge candidate list; and encoding residual samples between the current block and the prediction samples of the current block and the merge candidate index, and generating a bitstream including the encoded residual samples and merge candidate index.

BRIEF DESCRIPTION OF DRAWINGS

FIG. 9 illustrates a syntax for signalling intra merge information, according to an embodiment.

FIG. 11 illustrates processes of determining at least one coding unit when a coding unit having a non-square shape is split, according to an embodiment.

FIG. 20 illustrates processes of determining a depth of a coding unit as a shape and size of the coding unit are changed, when a plurality of coding units are determined when the coding unit is recursively split, according to an embodiment.

BEST MODE

Figure 1A:
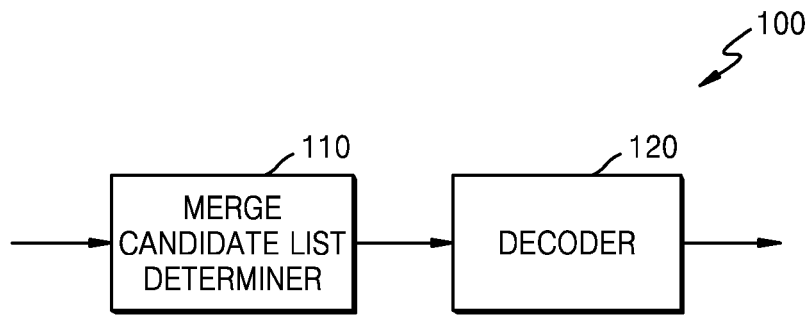
FIG. 1A is a block diagram of a video decoding apparatus according to an embodiment.

According to an aspect of the present disclosure, a video encoding method includes: determining whether it is possible to include an intra merge candidate in a merge candidate list; when it is possible to include the intra merge candidate in the merge candidate list, determining a merge candidate list including at least one of the intra merge candidate and an inter merge candidate of a current block; generating prediction samples of the current block by using a prediction candidate selected from the determined merge candidate list; and reconstructing the current block by using residual samples between the current block and the prediction samples of the current block. The inter merge candidate is a prediction block determined by motion information of at least one block selected from among a neighboring block spatially adjacent to the current block and a collocated block located corresponding to a position of the current block in a picture temporally adjacent to the current block, and the intra merge candidate is a prediction block determined using neighboring samples spatially adjacent to the current block.

According to another aspect of the present disclosure, a video decoding apparatus includes: a merge candidate list determiner configured to determine whether it is possible to include an intra merge candidate in a merge candidate list, and when it is possible to include the intra merge candidate in the merge candidate list, determine a merge candidate list including at least one of the intra merge candidate and an intra merge candidate of a current block; and a decoder configured to generate prediction samples of the current block by using a prediction candidate selected from the determined merge candidate list, and reconstruct the current block by using the prediction samples of the current block and residual samples of the current block.

According to another aspect of the present disclosure, a video encoding method includes: when an intra merge candidate is included in a merge candidate list, determining a merge candidate list including at least one of an intra merge candidate and an inter merge candidate of a current block; generating a merge candidate index indicating a prediction candidate selected for generating prediction samples of the current block in the determined merge candidate list; and encoding residual samples between the current block and the prediction samples of the current block and the merge candidate index, and generating a bitstream including the encoded residual samples and merge candidate index.

Mode Of Disclosure

Effects, features, and how to achieve them of the present disclosure will become apparent by reference to embodiments that will be described later in detail, together with the accompanying drawings. However, the present disclosure will now be described more fully with reference to embodiments. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

The terminology used herein will be briefly described, and embodiments will be described in detail.

The terms used herein are those general terms currently widely used in the art in consideration of functions in regard to the present disclosure, but the terms may vary according to the intention of those of ordinary skill in the art, precedents, or new technology in the art. In addition, specified terms may be selected by the applicant, and in this case, the detailed meaning thereof will be described in the detailed description of the present disclosure. Thus, the terms used herein should be understood not as simple names but based on the meaning of the terms and the overall description of the present disclosure.

As used herein, the singular forms "a," "an" and "the" are intended to include the plural forms as well, unless the context clearly indicates otherwise.

It will be understood that terms such as "comprise", "include", and "have", when used herein, specify the presence of stated elements, but do not preclude the presence or addition of one or more other elements. In addition, the term "unit" as used herein refers to a hardware component such as software or hardware component such as FPGA or ASIC, and "unit" performs certain functions. However, "unit" is not limited to software or hardware. A "unit" may be configured in an addressable storage medium or to reproduce one or more processors. Thus, for example, a "unit" includes components, such as software components, object-oriented software components, class components, and task components, processes, functions, attributes, procedures, subroutines, segments of programs codes, drivers, firmware, microcodes, circuits, data, databases, data structures, tables, arrays, and variables. Functions provided in the components and the "units" may be combined with a smaller number of components and "units" or may be separated from additional components and "units".

Hereinafter, an "image" may indicate a still image, such as a still picture of a video, or a moving picture, that is, the video itself.

Hereinafter, a 'sample' indicates data allocated to a sampling position of an image and data to be processed. For example, pixel values in an image of a spatial domain or transformation coefficients on a transformation domain may be samples. The unit including at least one sample may be defined as a block.

Hereinafter, embodiments will be described in detail with reference to the accompanying drawings so that those of ordinary skill in the art can easily carry out the present disclosure. The parts having no relation to the description will be omitted for clarity of the present disclosure.

A video encoding apparatus, a video decoding apparatus, a video encoding method, and a video decoding method, according to embodiments, will be described below with reference to FIGS. 1 through 23. A method and apparatus for performing inter prediction by using a merge candidate list determined according to embodiments, will be described with reference to FIGS. 1 through 9, and a method of determining a data unit of an image, according to embodiments, will be described with reference to FIGS. 10 through 23.

Hereinafter, a method and apparatus for performing inter prediction so as to encode or decode a block of an image, according to embodiment of the present disclosure, will be described with reference to FIGS. 1A through 9.

FIG. 1A is a block diagram of a video decoding apparatus 100 according to an embodiment.

The video decoding apparatus 100 according to the embodiment may include a merge candidate list determiner 110 and a decoder 120. In the video decoding apparatus 100 according to the embodiment, the merge candidate list determiner 110 and the decoder 120 may operate as individual processors, or may operate under the control of a central processor. In addition, although not illustrated in FIG. 1A, the video decoding apparatus 100 may further include a memory or a storage for storing data received from the outside and data generated by the merge candidate list determiner 110 and the decoder 120.

The video decoding apparatus 100 according to the embodiment may perform inter prediction according to a skip mode or a merge mode. The merge candidate list determiner 110 according to the embodiment may determine a merge candidate list including at least one merge candidate so as to perform the inter prediction according to the skip mode or the merge mode.

The merge candidate included in the merge candidate list, according to the embodiment, may be a prediction block determined based on motion information of at least one block selected from among a neighboring block spatially adjacent to a current block and a collocated block located corresponding to a position of the current block in a picture temporally adjacent to the current block. In the present disclosure, the prediction block determined based on the motion information of at least one block selected from among the neighboring block and the collocated block is referred to as an "inter merge candidate".

In the present disclosure, an "intra merge candidate" is proposed as a concept in contrast to the "inter merge candidate". According to an embodiment, the prediction block determined using the neighboring samples spatially adjacent to the current block may be used as the merge candidate. When the prediction block determined using the neighboring samples spatially adjacent to the current block is used as the merge candidate, the merge candidate is referred to as an "intra merge candidate" in the present disclosure.

The inter merge candidate will be described with reference to FIG. 3A, and the intra merge candidate will be described with reference to FIGS. 3B and 3C.

The merge candidate list determiner 110 according to the embodiment may determine whether it is possible to include the intra merge candidate in the merge candidate list. When it is possible to include the intra merge candidate in the merge candidate list, the merge candidate list determiner 110 may include at least one of an inter merge candidate and an intra merge candidate of the current block.

The decoder 12 according to the embodiment may generate prediction samples of the current block by using the prediction candidate selected from the merge candidate list generated by the merge candidate list determiner 110. The decoder 12 may reconstruct the current block by using residual samples between the current block and the prediction samples of the current block.

Hereinafter, the detailed operation of the video decoding apparatus 100 according to the embodiment will be described with reference to FIG. 1B.

Figure 1B:
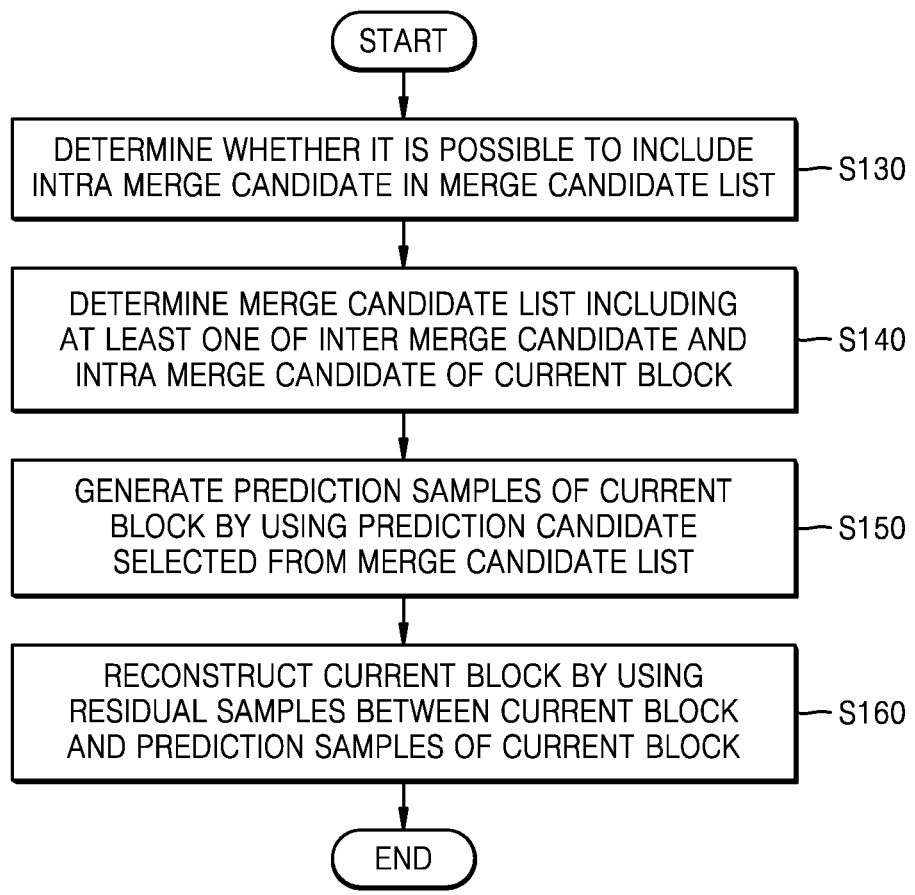
FIG. 1B is a flowchart of a video decoding method according to an embodiment.

FIG. 1B is a flowchart of a video decoding method according to an embodiment.

In operation S130, the video decoding apparatus 100 may determine whether it is possible to include an intra merge candidate in a merge candidate list.

When performing inter prediction in a skip mode or a merge mode, the video decoding apparatus 100 according to the embodiment may acquire, from a bitstream, intra merge information indicating whether it is possible to include the intra merge candidate in the merge candidate list.

For example, the video decoding apparatus 100 may perform entropy decoding on the bitstream to acquire a prediction mode flag for a current block. When the prediction mode flag indicates a prediction mode other than the intra prediction, the video decoding apparatus 100 may parse a skip flag for the current block from the bitstream.

For example, when the skip flag indicates the inter prediction according to the skip mode, the video decoding apparatus 100 does not parse the merge flag from the bitstream. However, when the skip flag does not indicate the inter prediction according to the skip mode, the video decoding apparatus 100 may further parse the merge flag from the bitstream. When the merge flag indicates the inter prediction according to the merge mode, the video decoding apparatus 100 may further parse intra merge information from the bitstream.

In another example, when the skip flag indicates the inter prediction according to the skip mode, and when the merge flag indicates the inter prediction according to the merge mode, the video decoding apparatus 100 may further parse intra merge information from the bitstream.

In one embodiment, when it is possible to include the intra merge candidate in the merge candidate list according to the intra merge information, the video decoding apparatus 100 may determine the merge candidate list including at least one of the inter merge candidate and the intra merge candidate of the current block.

In one embodiment, when the intra merge candidate using the neighboring samples spatially adjacent to the current block cannot be included in the merge candidate list according to the intra merge information, the video decoding apparatus 100 may determine the merge candidate list not including the intra merge candidate of the current block. That is, the merge candidate list including only the inter merge candidate may be determined.

In one embodiment, when it is possible to include the intra merge candidate in the merge candidate list, the video decoding apparatus 100 may determine the merge candidate list including at least one of the inter merge candidate and the intra merge candidate of the current block in operation S140. In operation S150, the video decoding apparatus 100 may generate prediction samples of the current block by using the prediction candidate selected from the merge candidate list generated in operation S140.

The inter merge candidate according to the embodiment may be a prediction block determined by motion information of at least one block selected from among the neighboring block spatially adjacent to the current block and the collocated block. The collocated block may be a block located within a picture temporally adjacent to the current block while corresponding to the position of the current block in the current image. Therefore, the motion information of the current block may be predicted by using the motion information of at least one selected from the neighboring block of the current block and the collocated block, and the prediction samples of the current block may be determined using sample values of the reference block indicated by the predicted motion information. Therefore, the prediction block according to the inter merge candidate may be a block including the prediction sample values determined using the sample value of the reference block.

The intra merge candidate according to the embodiment may be a prediction block determined using the neighboring samples spatially adjacent to the current block. The block including the sample values determined using the sample values of the samples adjacent to the outermost samples in the current block while located outside the current block may be determined as the prediction block, and such a prediction block may be included in the merge candidate list as the intra merge candidate.

For example, the intra merge candidate may be determined using a predetermined number of neighboring samples spatially adjacent to the current block in a predetermined direction. In another example, the intra merge candidate may be determined using a predetermined number of neighboring samples adjacent in a predetermined direction and determined from a direction indicated by a most probable mode (MPM) index acquired from the bitstream. For example, the MPM index may indicate one of a predetermined number of intra prediction modes that usable for the intra prediction of the current block. The predetermined number of intra prediction modes may include an intra prediction mode of a neighboring block and a specific intra prediction mode.

In another example, the sample value according to the intra merge candidate determined using the neighboring samples spatially adjacent to the current block, and the samples determined by the weighted average of the prediction sample values according to at least one inter merge candidate may be determined as the inter-intra merge candidate, and the inter-intra merge candidate may be included in the merge candidate list.

The video decoding apparatus 100 may acquire, from the bitstream, the merge candidate index indicating one candidate in the merge candidate list. The video decoding apparatus 100 may generate the prediction samples of the current block by using the prediction candidate indicated by the merge candidate index in the merge candidate list.

The video decoding apparatus 100 according to the embodiment may determine the inter merge candidate list including at least one inter merge candidate, and may determine the intra merge candidate list including at least one intra merge candidate. The intra merge candidate list may further include the inter-intra merge candidate. Therefore, the video decoding apparatus 100 according to the embodiment may generate prediction samples of the current block by using the prediction candidate selected from among the inter merge candidate list and the intra merge candidate list. In this case, the prediction samples may be determined using the merge candidate index indicating one of the candidates of the inter merge candidate list and the candidates of the intra merge candidate list.

The video decoding apparatus 100 according to another embodiment may determine one merge candidate list including at least one of the inter merge candidate, the intra merge candidate, and the inter-intra merge candidate. One merge candidate list may further include the inter-intra merge candidate. Therefore, the video decoding apparatus 100 may generate prediction samples of the current block by using the prediction candidate selected from one merge candidate list. In this case, the prediction samples may be determined using the merge candidate index indicating one of the merge candidates included in one merge candidate list.

The merge candidate list including at least one of the inter merge candidate, the intra merge candidate, and the inter-intra merge candidate will be described with reference to FIGS. 4, 5, 6A, 6B, 6C, 7, and 8.

The video decoding apparatus 100 may generate the prediction samples of the current block by using the prediction candidate indicated by the merge candidate index in the merge candidate list.

When performing the inter prediction according to the inter merge candidate, the video decoding apparatus 100 according to the embodiment may acquire motion vector differential (mvd) information from the bitstream. The video decoding apparatus 100 may determine one candidate in the merge candidate list, based on the acquired merge candidate index. When the determined candidate is the inter merge candidate, a prediction direction L0 or L1, a reference index, and a motion vector predictor (mvp) of the current block may be determined using a prediction direction L0 or L1, a reference index, and a motion vector of the candidate block. A motion vector of the current block may be determined by adding the motion vector predictor (mvp) and the motion vector differential (mvd) value. The sample values of the reference block indicated by the motion vector of the current block may be determined as the prediction sample values according to the inter merge candidate of the current block.

When performing the inter prediction according to the intra merge candidate, the video decoding apparatus 100 according to the embodiment may acquire the intra prediction mode information indicating the intra prediction direction from the bitstream. The video decoding apparatus 100 may determine the prediction sample values according to the intra merge candidate of the current block by using the neighboring sample values indicated by the intra prediction mode. The neighboring samples according to the intra merge candidate will be described with reference to FIG. 3B, and the intra prediction direction and the intra prediction mode will be described with reference to FIG. 3C.

In operation S160, the video decoding apparatus 100 may reconstruct the current block by using the residual samples between the current block and the prediction samples of the current block. The video decoding apparatus 100 may perform entropy decoding on the bitstream, parse the residual signals of the blocks according to the block scan order and the scan order of the samples within the block, and acquire the residual signal of the current block. The video decoding apparatus 100 may perform inverse-quantization and inverse-transformation on the residual signals of the current block so as to reconstruct the residual samples of the spatial domain of the current block.

The video decoding apparatus 100 may reconstruct the samples of the current block by adding the reconstructed residual samples of the current block to the prediction samples of the current block determined by performing the inter prediction. The video decoding apparatus 100 may reconstruct the current image by reconstructing the samples for each block.

Figure 2A:
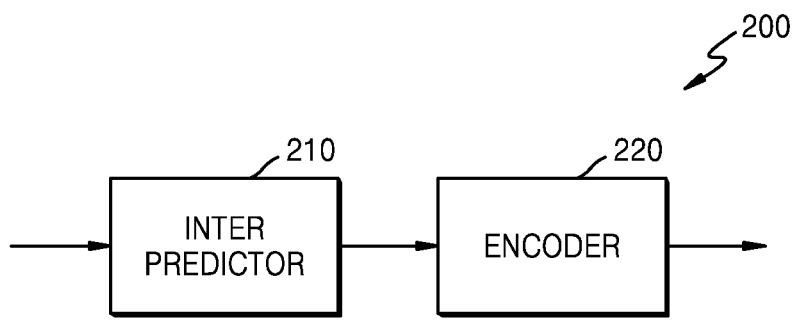
FIG. 2A is a block diagram of a video encoding apparatus according to an embodiment.

FIG. 2A is a block diagram of a video encoding apparatus 200 according to an embodiment.

The video encoding apparatus 200 according to the embodiment includes an inter predictor 210 and an encoder 220. In the video encoding apparatus 200 according to the embodiment, the inter predictor 210 and the encoder 220 may operate as individual processors, or may operate under the control of a central processor. In addition, although not illustrated in FIG. 2A, the video encoding apparatus 200 may further include a memory or a storage for storing data generated during an encoding process and data generated by the inter predictor 210 and the encoder 220.

The video encoding apparatus 200 according to the embodiment may perform inter prediction according to a skip mode or a merge mode. The inter predictor according to the embodiment may determine a merge candidate list including at least one merge candidate so as to perform the inter prediction according to the skip mode or the merge mode.

When the intra merge candidate is included in the merge candidate list, the inter predictor 210 according to the embodiment may determine the merge candidate list including at least one of an inter merge candidate and an intra merge candidate of the current block.

The merge candidate list used for performing the inter prediction in the skip mode or the merge mode, according to the embodiment, may include at least one of the inter merge candidate, the intra merge candidate, and the inter-intra merge candidate as the merge candidate. As defined as above, the inter merge candidate according to the embodiment may include a prediction block determined by motion information of at least one block selected from among the neighboring block of the current block and the collocated block. In addition, the intra merge candidate according to the embodiment may include a prediction block determined using the neighboring samples spatially adjacent to the current block. The inter-intra merge candidate according to the embodiment may include a prediction block having a weighted average of the prediction sample value according to the inter merge candidate and the prediction sample value according to the intra merge candidate as the prediction sample value.

The inter predictor 210 according to the embodiment may generate the merge candidate index indicating the prediction candidate selected for generating the prediction samples of the current block in the merge candidate list.

The encoder 220 according to the embodiment may encode the residual samples between the current block and the prediction samples of the current block and the merge candidate index, and generate a bitstream including the encoded information.

Hereinafter, the detailed operation of the video encoding apparatus 200 according to the embodiment will be described with reference to FIG. 2B.

Figure 2B:
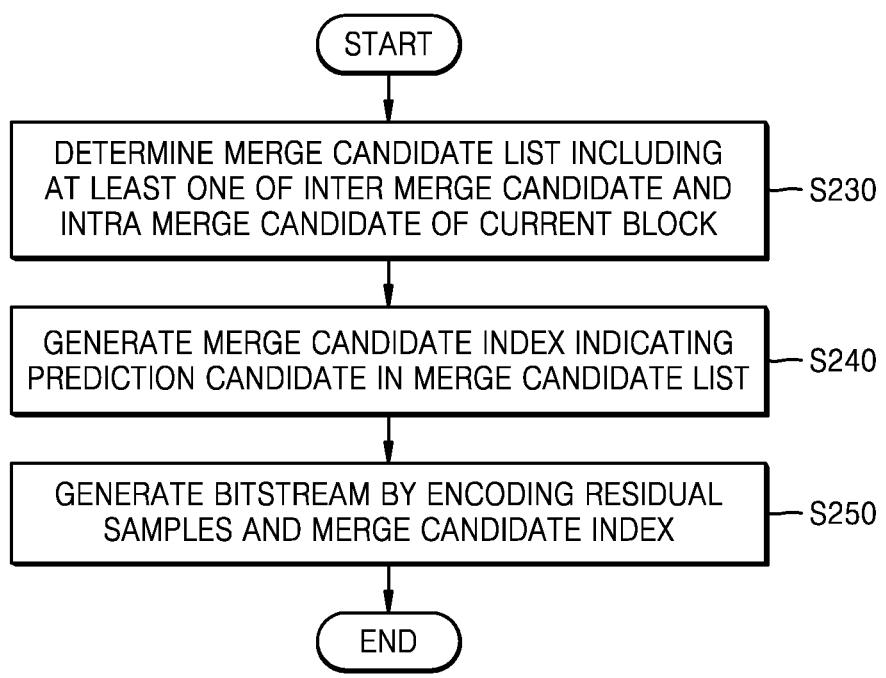
FIG. 2B is a flowchart of a video encoding method according to an embodiment.

FIG. 2B is a flowchart of a video encoding method according to an embodiment.

In operation S230, in a case where the video encoding apparatus 200 performs the inter prediction in the skip mode or the merge mode, when the intra merge candidate is included in the merge candidate list, the video encoding apparatus 200 may determine the merge candidate list including at least one of the inter merge candidate and the intra merge candidate of the current block. In operation S240, the video encoding apparatus 200 may determine the merge candidate index indicating the prediction candidate selected for generating the prediction samples of the current block in the merge candidate list generated in operation S230, and encode a value indicating the merge candidate index.

Since the inter merge candidate, the intra merge candidate, and the inter-intra merge candidate used in the video encoding apparatus 200 according to the embodiment correspond to the inter merge candidate, the intra merge candidate, and the inter-intra merge candidate described above in the video decoding apparatus 100 according to various embodiments, respectively, a redundant description thereof is omitted.

The video encoding apparatus 200 according to the embodiment may determine the inter merge candidate list including at least one inter merge candidate, and may determine the intra merge candidate list including at least one intra merge candidate. The intra merge candidate list may further include the inter-intra merge candidate. Therefore, the video encoding apparatus 200 according to the embodiment may generate prediction samples of the current block by using the prediction candidate selected from among the inter merge candidate list and the intra merge candidate list. In this case, the video encoding apparatus 200 may encode the merge candidate index indicating one of the candidates of the inter merge candidate list and the candidates of the intra merge candidate list.

The video encoding apparatus 200 according to another embodiment may determine one merge candidate list including at least one inter merge candidate and at least one intra merge candidate. One merge candidate list may further include the inter-intra merge candidate. Therefore, the video encoding apparatus 200 may generate prediction samples of the current block by using the prediction candidate selected from one merge candidate list. In this case, the video encoding apparatus 200 may encode the merge candidate index indicating one of the merge candidates included in one merge candidate list.

The video encoding apparatus 200 according to the embodiment may perform the inter prediction based on the candidate included in the merge candidate list, and compare rate-distortion (RD) costs generated by the inter prediction for each candidate. The video encoding apparatus 200 according to the embodiment may select the merge candidate generating the minimum RD cost among the candidates, and determine the merge candidate index indicating the selected merge candidate among the merge candidates included in the merge candidate list.

In operation S250, the video encoding apparatus 200 may encode the residual samples between the current block and the prediction samples of the current block and the merge candidate index. For example, the video encoding apparatus 200 may perform entropy encoding on the residual samples of the current block and the merge candidate index, and generate the bitstream including the generated bits. In addition, the video encoding apparatus 200 may perform transformation and quantization on the samples of the current block so as to generate quantized transformation coefficients of the samples, and perform inverse-quantization and inverse-transformation on the quantized transformation coefficients so as to reconstruct the samples of the spatial domain. The video encoding apparatus 200 may determine residual samples that are the difference values between the prediction samples of the current block determined according to the prediction mode and the reconstructed samples of the current block.

In addition, the video encoding apparatus 200 may optionally determine whether the intra merge candidate is included in the merge candidate list. Therefore, the video encoding apparatus 200 may generate intra merge information indicating whether the intra merge candidate is included in the merge candidate list. The video encoding apparatus 200 may encode the intra merge information, and encode the merge candidate index when the intra merge candidate is included in the merge candidate list.

In addition, the video encoding apparatus 200 may further encode a prediction mode flag for the current block. The video encoding apparatus 200 may further encode the prediction mode flag indicating whether the prediction mode is the intra prediction mode. In addition, when the prediction mode of the current block is not the intra prediction mode, the video encoding apparatus 200 may further encode a skip flag indicating whether the current block is predicted in the skip mode or a merge flag indicating whether the current block is predicted in a merge mode.

For example, when the current block is predicted according to the skip mode, the video encoding apparatus 200 may encode a skip mode flag indicating that the current block is predicted in the skip mode, and encode only the index indicating the neighboring block that is to refer to the motion information, but may no longer encode the information about the merge mode. However, when the current block is predicted according to the skip mode, the video encoding apparatus 200 may encode the skip mode flag indicating that the current block is not the skip mode, and further encode the merge flag indicating whether the current block is predicted in the merge mode. When the inter prediction according to the merge mode is performed for the current block, the video encoding apparatus 200 may further encode the merge mode flag indicating that the current block is predicted in the merge mode, the intra merge information, and the merge candidate index information.

When performing the inter prediction according to the inter merge candidate, the video encoding apparatus 200 according to the embodiment may further encode motion vector differential (mvd) information. When the inter merge candidate is selected from the merge candidate list, the video encoding apparatus 200 may determine the motion vector predictor of the current block by using the motion vector of the candidate block. Therefore, motion vector difference information that is a difference value between the motion vector and the motion vector predictor of the current block may be determined. The sample values of the reference block indicated by the motion vector of the current block may be determined as the prediction sample values according to the inter merge candidate of the current block, and the difference values between the prediction samples and the reconstructed samples of the current block may be encoded as residual information.

When performing the inter prediction according to the intra merge candidate, the video encoding apparatus 200 according to the embodiment may further encode the intra prediction mode information indicating the intra prediction direction. The video encoding apparatus 200 may determine the prediction sample values according to the intra merge candidate of the current block by using the neighboring sample values indicated by the intra prediction mode. The neighboring samples according to the intra merge candidate will be described with reference to FIG. 3B, and the intra prediction direction and the intra prediction mode will be described with reference to FIG. 3C.

According to the video encoding apparatus 200 or the video decoding apparatus 100 proposed in the present disclosure, the neighboring sample values spatially adjacent to the current block, as well as the motion information of the neighboring block of the current block or the collocated block, are included in the merge candidate list as the merge candidate that is to be referred to in the inter prediction of the current block, so as to predict the current block accurately and effectively.

Figure 3A:
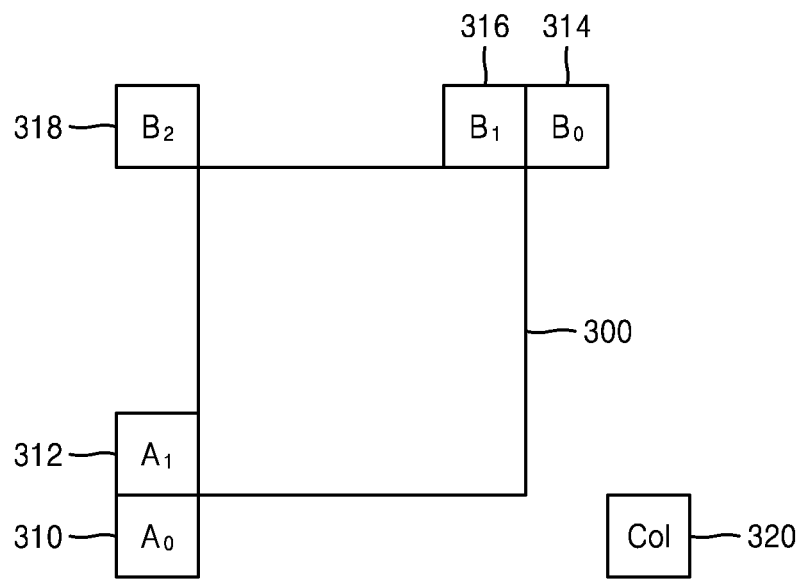
FIG. 3A illustrates inter merge candidates that can be included in a merge candidate list.

FIG. 3A illustrates inter merge candidates that can be included in the merge candidate list.

The video decoding apparatus 100 may determine a merge mode list so as to perform inter prediction on a current block 300 according to a skip mode or a merge mode.

In the case of the skip mode, sample values of a reference block indicated by a prediction direction L0 or L1, a reference index, and a motion vector of the current block, which are determined using a prediction direction L0 or L1, a reference index, and a motion vector of a candidate block determined in the merge mode list, may be determined as samples values of the current block 300.

In the case of the merge mode, a prediction direction L0 or L1, a reference index, and a motion vector predictor of the current block may be determined using a prediction direction L0 or L1, a reference index, and a motion vector of a candidate block determined in the merge mode list, and a motion vector of the current block 300 may be determined by adding the motion vector predictor and the motion vector difference information. Therefore, sample values of the reference block indicated by the prediction direction L0 or L1, the reference index, and the motion vector of the current block may be determined as prediction sample values of the current block, and sample values of the current block 300 may be determined by adding the prediction sample values and the residual sample values.

Therefore, in the inter prediction technique, a process of determining another block used to encode the current block is preceded. Since the block having similar tendency to the current block is generally used, neighboring blocks spatially adjacent to the current block in the current image or blocks in a temporally different image located at a position similar to a position at which the current block is located in the current image may be used.

The merge candidate list according to the embodiment may include at least one inter merge candidate. The inter merge candidate may include at least one block selected from among neighboring blocks A0 310, A1 312, B0 314, B1 316, and B2 318 spatially adjacent to the current block, and a collocated block Col 320 located corresponding to the position of the current block in a picture temporally adjacent to the current block.

Specifically, the neighboring block A0 310 may be a block including a sample adjacent to the outside in a left lower diagonal direction of a sample located at a left lower corner in samples of the current block 300 among blocks adjacent to the outside of the current block 300.

The neighboring block A1 312 may be a block including a sample adjacent to the left outside of a sample located at a left lower corner in the samples of the current block 300 among the blocks adjacent to the outside of the current block 300.

The neighboring block B0 314 may be a block including a sample adjacent to the outside in a right upper diagonal direction of a sample located at a right upper corner in the samples of the current block 300 among the blocks adjacent to the outside of the current block 300.

The neighboring block B1 316 may be a block including a sample adjacent to the upper outside of a sample located at a right upper corner in the samples of the current block 300 among the blocks adjacent to the outside of the current block 300.

The neighboring block B2 318 may be a block including a sample adjacent to the outside in a left upper diagonal direction of a sample located at a left upper corner in the samples of the current block 300 among the blocks adjacent to the outside of the current block 300.

The collocated block Col 320 may be a block existing at a position corresponding to the current block 300 in the current image among blocks within an image (collocated image) temporally different from the current image including the current block. For example, a same location block including the position corresponding to the coordinates of the current block 300 in the current image may be selected from among the blocks of the collocated image, and a block H adjacent to the outside in a diagonal direction at a right lower corner of the selected block may be determined as the collocated block 320. However, when valid motion information about the block H is not defined, a block including the central position of the same location block may be determined as the collocated block 320.

At this time, the current block 300 may be a coding unit (CU), or may be a sub-block determined within the coding unit for the prediction of the coding unit.

Figure 3B:
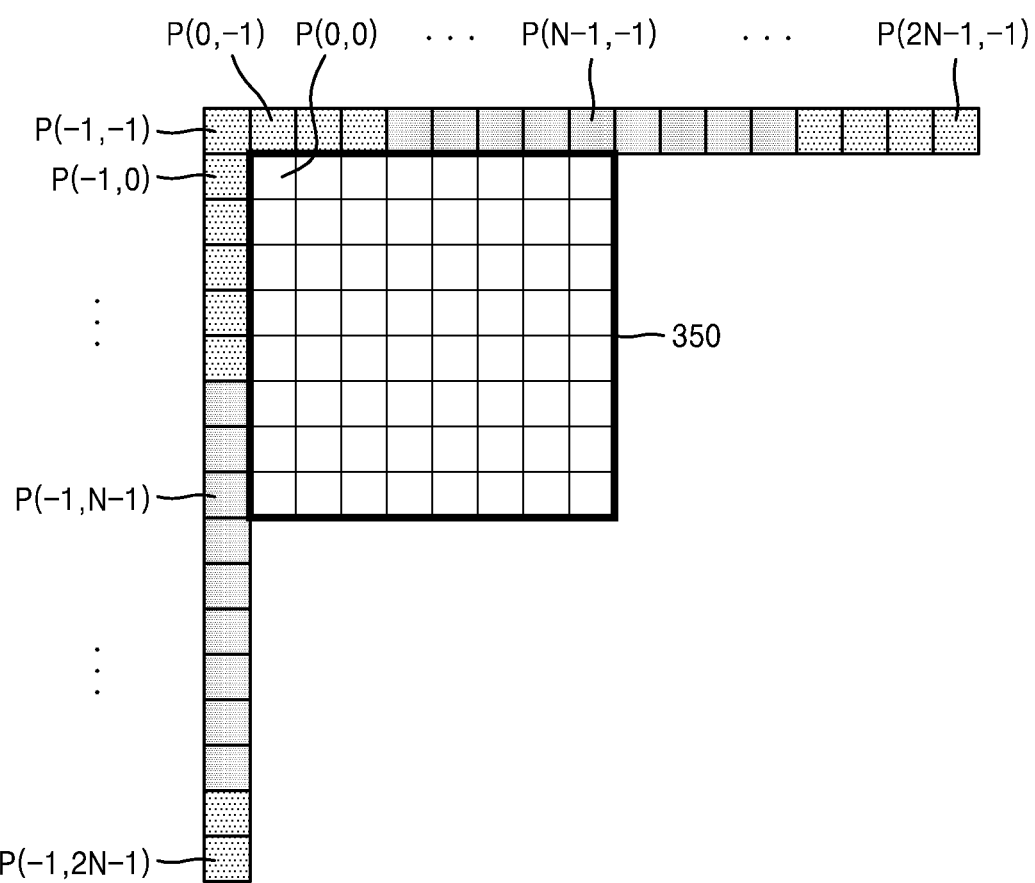
FIGS. 3B and 3C illustrate intra merge candidates that can be included in a merge candidate list, according to an embodiment.
Figure 3C:
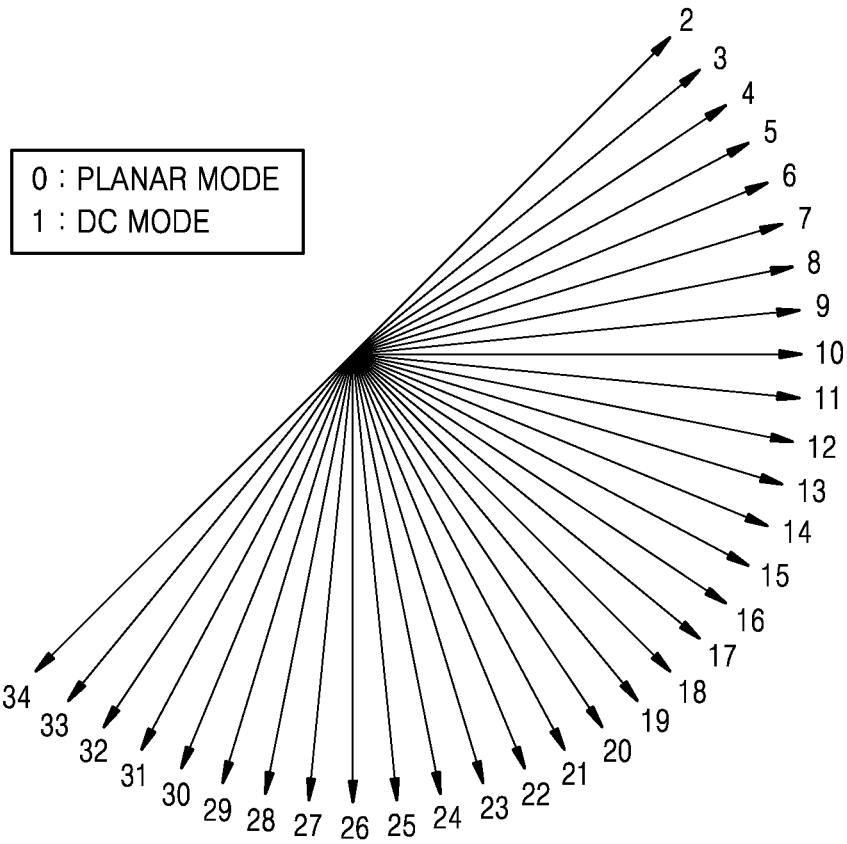

FIGS. 3B and 3C illustrate intra merge candidates that can be included in a merge candidate list, according to an embodiment.

According to an embodiment, an intra merge candidate may include a prediction block determined using neighboring samples spatially adjacent to a current block 350.

The neighboring samples may be selected from among reconstructed samples adjacent to the outside of the current block 300. When a sample of a left upper corner of the current block 350 is $P(0, 0)$ and a height or a width of the current block 350 that is the square is N, neighboring samples may include $P(-1, -1)$ and $P(2N-1, -1)$ and may include samples horizontally located in a row between $P(-1, -1)$ and $P(2N-1, -1)$. In addition, the neighboring samples may include $P(-1, -1)$ and $P(-1, 2N-1)$ and may include samples vertically located in a row between $P(-1, -1)$ and $P(-1, 2N-1)$.

At this time, the current block 350 may be a coding unit (CU), or may be a sub-block determined within the coding unit for the transformation of the coding unit.

The neighboring samples that may be referred to for the intra prediction of the current block may be changed according to the prediction direction of the intra prediction. That is, the samples that are referred to among the neighboring samples horizontally arranged from P(−1, −1) to P(2N−1, −1) may be changed according to the prediction direction, and the samples that are referred to among the neighboring samples vertically arranged from P(−1, −1) to P(−1, 2N−1) may be changed according to the prediction direction.

According to an embodiment, the intra prediction modes that may be adopted in the intra prediction direction are illustrated in FIG. 3C. Each arrow means the prediction direction indicating the neighboring sample for reference from the current block, and each number indicates an index corresponding to the intra prediction mode.

The intra prediction mode in which a specific prediction direction is matched like the arrow is referred to as an angular mode, and the intra prediction mode in which the specific prediction direction is not matched is referred to as a non-angular mode.

Examples of the non-angular mode include a planar mode and a DC mode. In FIG. 3C, an intra prediction mode index 0 indicates a planar mode, and an intra prediction mode index 1 indicates a DC mode.

According to the planar mode, when the neighboring sample values are gradually changed according to the change in the coordinates of the neighboring samples surrounding the current block 350, the prediction value is determined so that the gradation according to the change in the neighboring sample values is reflected to the prediction sample. Therefore, similar to the gradation of the neighboring sample values, prediction sample values may gradually increase or decrease according to the increase in the coordinates of the prediction samples. According to the DC mode, the current prediction sample values may be uniformly determined by the average value of the neighboring samples surrounding the current block 350.

The angular mode is a prediction mode according to the prediction direction matching the intra prediction mode indices 2 to 34 illustrated in FIG. 3C. That is, the prediction sample values of the current block 350 may be determined according to the tendency of sample values located in a specific arrow direction among the neighboring samples of the current block 350. To this end, the prediction sample values for the samples located in the corresponding direction within the current block 350 may be determined by taking sample values located in the prediction direction among the neighboring samples of the current block 350. The prediction block including such prediction sample values may be determined.

For example, the video decoding apparatus 100 may use a predetermined number of intra prediction modes so as to determine the intra merge candidate. In a specific example, the prediction block according to one of four intra modes including a planar mode (intra prediction mode index 0), a DC mode (intra prediction mode index 1), a vertical mode (intra prediction mode index 26), and a horizontal mode (intra prediction mode index 10) among the intra prediction modes illustrated in FIG. 3C may be used as the intra merge candidate.

In another example, the video decoding apparatus 100 may use, as the intra merge candidate, the prediction block according to the intra prediction mode determined based on the intra mode of the neighboring block or the previous picture. In a specific example, the prediction block according to an MPM index indicating one of the intra prediction modes of the neighboring blocks may be used as the intra merge candidate.

When the inter prediction using the merge candidate list including the intra merge candidate is possible, the video decoding apparatus 100 according to the embodiment may determine the merge candidate list including at least one intra merge candidate. The merge candidate list according to various embodiments will be described with reference to FIGS. 4, 5, 6A, 6B, 6C, 7, and 9. In the drawings, "MVm" (m is an integer) indicates inter merge candidates, and "IPMn" (n is an integer) indicates intra merge candidates. "IPMn&&MVm" indicates an inter-intra merge candidate in which the intra merge candidate "IPMn" and the inter merge candidate "MVm" are combined. For example, the inter-intra merge candidate "IPMn&MVm" may be determined by the weighted average of the prediction value according to the intra merge candidate "IPMn" and the prediction value according to the inter merge candidate "MVm".

Figure 4:
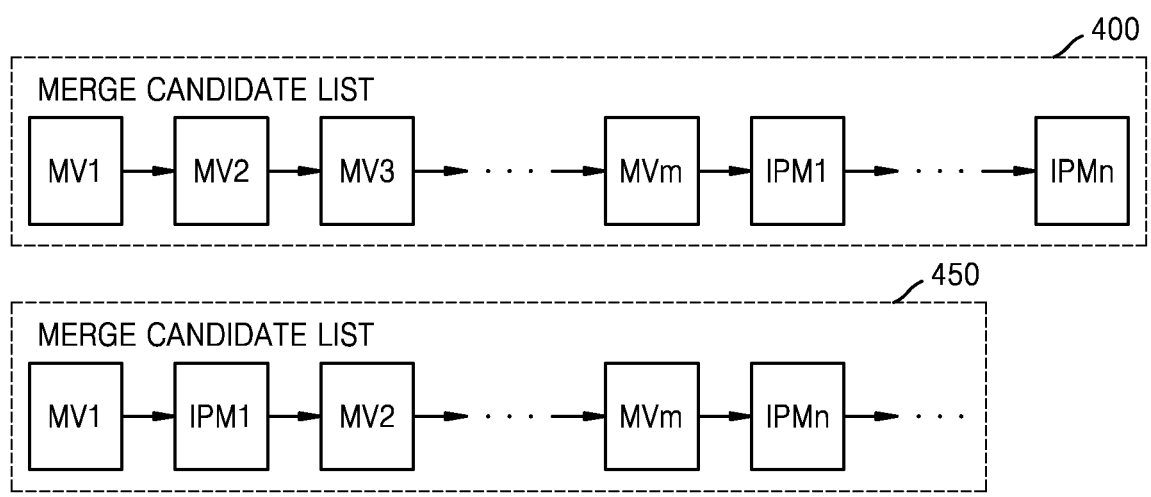
FIG. 4 illustrates a merge candidate list in which an inter merge candidate and an intra merge candidate are included at the same time, according to an embodiment.

FIG. 4 illustrates a merge candidate list in which an inter merge candidate and an intra merge candidate are included at the same time, according to an embodiment.

When performing inter prediction in a skip mode or a merge mode, the video decoding apparatus 100 according to the embodiment may determine a merge candidate list 400 or 450 including at least one inter merge candidate and at least one intra merge candidate.

For example, the video decoding apparatus 100 may generate the merge candidate list 400 including inter merge candidates MV1, MV2, MV3, . . . , VMm, and add intra merge candidates IPM1, IPM2, . . . , IPMn to the merge candidate list 400. Alternatively, the video decoding apparatus 100 may determine the merge candidate list 400 including the inter merge candidates MV1, MV2, MV3, . . . , VMm, and determine the merge candidate list 400 by adding the intra merge candidates IPM1, IPM2, . . . , IPMn between the inter merge candidates of the merge candidate list 400 one by one.

The video decoding apparatus 100 may perform the inter prediction by using one candidate indicated by the merge candidate index among the inter merge candidates and the intra merge candidates included in the merge candidate list 400 or 450.

In addition, in order to perform the inter prediction in the skip mode or the merge mode, the video encoding apparatus 200 may also generate the merge candidate list 400 or 450 including the inter merge candidates MV1, MV2, MV3, . . . , VMm, and add the intra merge candidates IPM1, IPM2, . . . , IPMn to the merge candidate list 400 or 450. The video encoding apparatus 200 may encode the merge candidate index indicating one candidate used for the inter prediction among the inter merge candidates and the intra merge candidates included in the merge candidate list 400 or 450.

Figure 5:
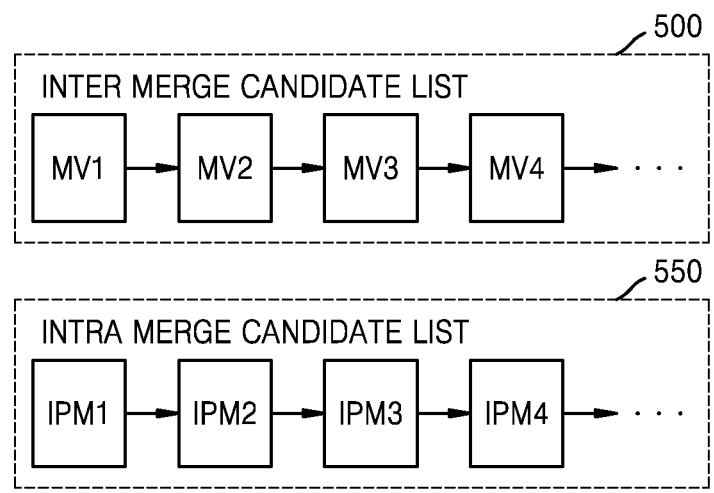
FIG. 5 illustrates an inter merge candidate list including an inter merge candidate and an intra merge candidate list including an intra merge candidate, according to an embodiment.

FIG. 5 illustrates an inter merge candidate list including an inter merge candidate and an intra merge candidate list including an intra merge candidate, according to an embodiment.

When performing inter prediction in a skip mode or a merge mode, the video decoding apparatus 100 according to the embodiment may determine an inter merge candidate list 500 including at least one inter merge candidate, and an intra merge candidate list 550 including at least one intra merge candidate.

For example, the video decoding apparatus 100 may determine the inter merge candidate list 500 including inter merge candidates MV1, MV2, MV3, MV4, . . . , VMm. In addition, when the inter prediction using the intra merge candidate is possible, the video decoding apparatus 100 may determine the intra merge candidate list 550 including intra merge candidates IPM1, IPM2, IPM3, IPM4, . . . , IPMn.

The video decoding apparatus 100 may perform the inter prediction by using one candidate indicated by the merge candidate index among the inter merge candidates included in the inter merge candidate list 500 and the intra merge candidates included in the intra merge candidate list 550.

In addition, when the inter prediction using the intra merge candidate is possible, the video encoding apparatus 200 may determine the inter merge candidate list 500 including the inter merge candidates MV1, MV2, MV3, MV4, . . . , VMm, and determine the intra merge candidate list 550 including the intra merge candidates IPM1, IPM2, IPM3, IPM4, . . . , IPMn. The video encoding apparatus 200 may encode the merge candidate index indicating one candidate used for the inter prediction among the inter merge candidates included in the inter merge candidate list 500 and the intra merge candidates included in the intra merge candidate list 550.

Figure 6A:
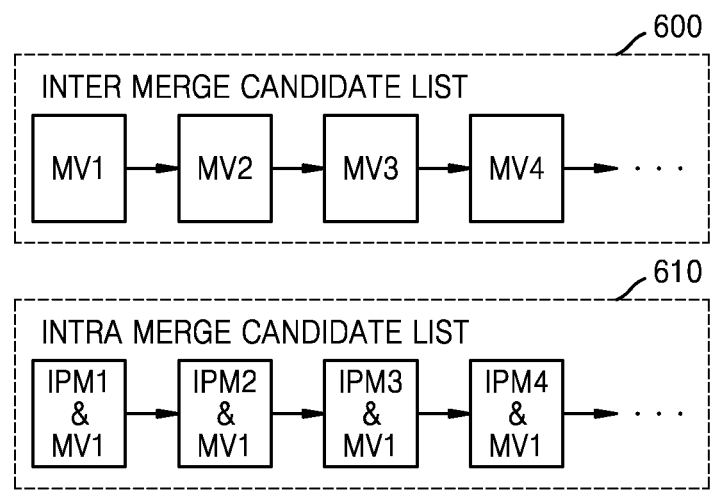
FIGS. 6A, 6B, and 6C illustrate an intra merge candidate list in which a weighted average prediction sample value of an inter merge candidate and an intra merge candidate is included as an inter-intra merge candidate, according to an embodiment.
Figure 6B:
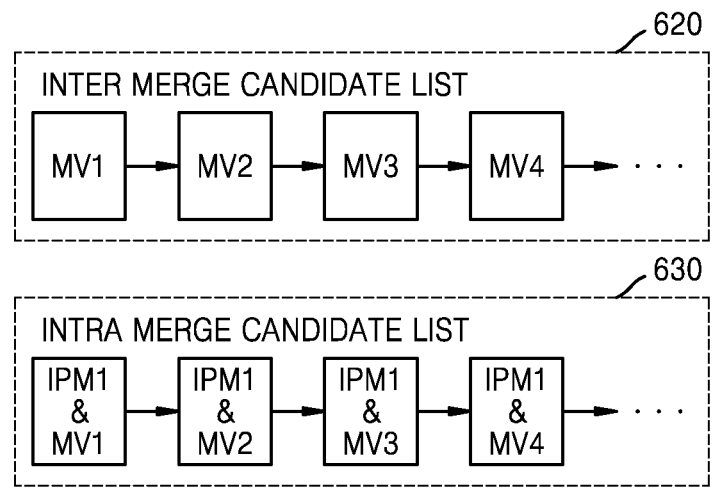
Figure 6C:
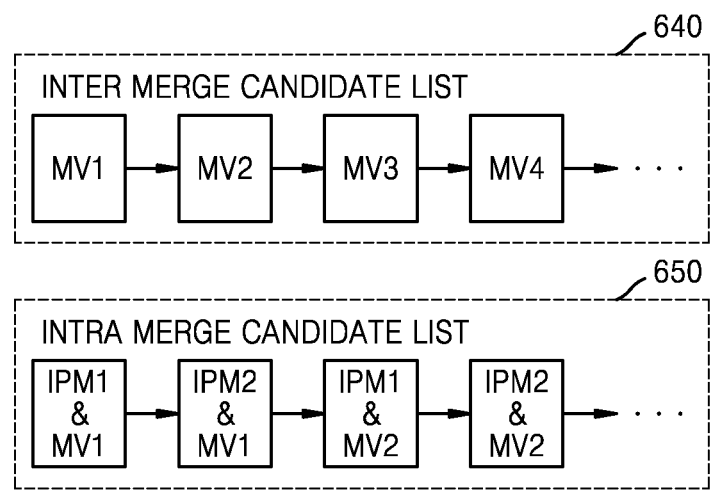

FIGS. 6A, 6B, and 6C illustrate an intra merge candidate list in which a weighted average prediction sample value of an inter merge candidate and an intra merge candidate is included as an inter-intra merge candidate, according to an embodiment.

When performing inter prediction in a skip mode or a merge mode, the video decoding apparatus 100 according to the embodiment may determine a merge candidate list 610, 630, or 650 including at least one inter-intra merge candidate in which an inter merge candidate and an intra merge candidate are combined.

The combination of the inter merge candidate and the intra merge candidate for generating the inter-intra merge candidate may be various. For example, at least one inter-intra merge candidate may be determined by combining one candidate of at least one intra merge candidate and one inter merge candidate. In another example, at least one inter-intra merge candidate may be determined by combining one candidate of at least one inter merge candidate and one intra merge candidate. In another example, at least one inter-intra merge candidate may be determined by combining one candidate of at least one inter merge candidate and one candidate of at least one intra merge candidate.

In a specific example, the video decoding apparatus 100 in FIG. 6A may determine the inter merge candidate list 600 including inter merge candidates MV1, MV2, MV3, MV4, . . . , VMm. In addition, when the inter prediction using the intra merge candidate is possible, the inter-intra merge candidates IPM1&MV1, IPM2&MV2, IPM3&MV1, IPM4&MV1, . . . , IPMn&MV1 may be determined by combining one intra merge candidate of the intra merge candidates IPM1, IPM2, IPM3, IPM4, . . . , IPMn and one inter merge candidate MV1. The video decoding apparatus 100 may determine the intra merge candidate list 610 including at least one of the inter-intra merge candidates IPM1&MV1, IPM2&MV1, IPM3&MV1, IPM4&MV1, . . . , IPMn&MV1.

In another specific example, the video decoding apparatus 100 in FIG. 6B may determine the inter merge candidate list 620 including the inter merge candidates MV1, MV2, MV3, MV4, . . . , VMm. In addition, when the inter prediction using the intra merge candidate is possible, the video decoding apparatus 100 may determine the inter-intra merge candidates IPM1&MV1, IPM2&MV2, IPM3&MV1, IPM4&MV1, . . . , IPMn&MV1 by combining one inter merge candidate of the inter merge candidates MV1, MV2, MV3, MV4, . . . , MVm and one intra merge candidate IPM1. The video decoding apparatus 100 may determine the intra merge candidate list 630 including at least one of the inter-intra merge candidates IPM1&MV1, IPM2&MV2, IPM3&MV3, IPM4&MV4, . . . , IPMn&MVn.

In another specific example, the video decoding apparatus 100 in FIG. 6C may determine the inter merge candidate list 640 including the inter merge candidates MV1, MV2, MV3, MV4, . . . , VMm. In addition, when the inter prediction using the intra merge candidate is possible, the video decoding apparatus 100 may determine the inter-intra merge candidates IPM1&MV1, IPM2&MV1, IPM1&MV2, IPM2&MV2, . . . , IPMn&MVm by combining one inter merge candidate of the inter merge candidates MV1, MV2, MV3, MV4, . . . , MVm and one intra merge candidate of the intra merge candidates IPM1, IPM2, IPM3, IPM4, . . . , IPMn. The video decoding apparatus 100 may determine the intra merge candidate list 650 including at least one of the inter-intra merge candidates IPM1&MV1, IPM2&MV1, IPM1&MV2, IPM2&MV2, . . . , IPMn&MVm.

For example, the prediction value according to one inter-intra merge candidate may be determined by the weighted average of the prediction value according to the inter merge candidate and the prediction value according to the intra merge candidate. For the weights for the weighted average, the weight of the prediction value according to the inter merge candidate may be set to be equal to or different from the weight of the prediction value according to the intra merge candidate.

The video decoding apparatus 100 according to the embodiment may determine the weight for the inter merge candidate and the weight for the intra merge candidate for determining the inter-intra merge candidate by using the coding mode of the neighboring block.

In a specific example, the weight of the intra merge candidate may be determined according to the intra prediction mode of the neighboring block used to determine the intra merge candidate. When the neighboring block is predicted in the inter mode, the weight of the intra merge candidate may be determined according to an inter partition mode of the neighboring block.

In another specific example, the weight of the intra merge candidate may be determined according to quantization parameters of the neighboring block used to determine the intra merge candidate.

Alternatively, when the neighboring block is a coding unit, the weight of the intra merge candidate may be determined according to the depth (partition level, number of times of partitions) or size of the coding unit. When the neighboring block is a prediction unit, the weight of the intra merge candidate may be determined according to the size of the prediction unit. When the neighboring block is a transformation unit, the weight of the intra merge candidate may be determined according to the size of the transformation unit.

After the weight of the intra merge candidate is determined according to the coding mode of the neighboring block, the weight of the inter merge candidate may be determined as a value for normalization of the weighted sum.

It should be noted that the method of combining the inter merge candidate and the intra merge candidate, which is possible for determining the prediction value according to the inter-intra merge candidate, is not limited to the above-described method.

The video decoding apparatus 100 may perform the inter prediction by using one candidate indicated by the merge candidate index among the inter merge candidates included in the inter merge candidate list 600, 620, or 640 and the inter-intra merge candidates included in the intra merge candidate list 610, 630, or 650.

In addition, when the inter prediction using the intra merge candidate is possible, the video encoding apparatus 200 may determine the inter merge candidate list 600, 620, or 640 including the inter merge candidates MV1, MV2, MV3, MV4, . . . , VMm, and determine the intra merge candidate list 610, 630, or 650 including the inter-intra merge candidates. The video encoding apparatus 200 may encode the merge candidate index indicating one candidate used for the inter prediction among the inter merge candidates included in the inter merge candidate list 600, 620, or 640 and the inter-intra merge candidates included in the intra merge candidate list 610, 630, or 650.

Figure 7:
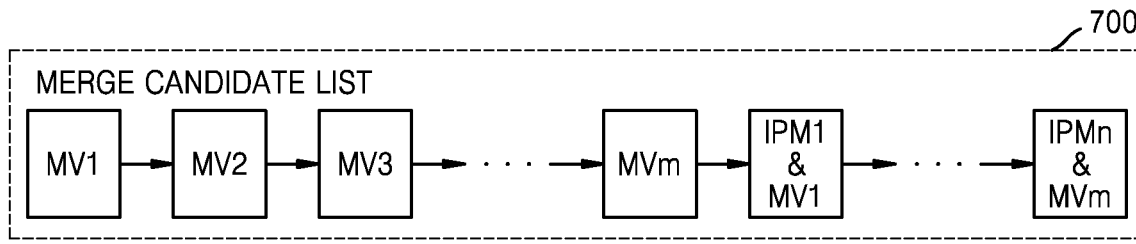
FIG. 7 illustrates a merge candidate list including an inter merge candidate and an inter-intra merge candidate, according to an embodiment.

FIG. 7 illustrates a merge candidate list including an inter merge candidate and an inter-intra merge candidate, according to an embodiment.

When performing inter prediction in a skip mode or a merge mode, the video decoding apparatus 100 according to the embodiment may determine a merge candidate list 700 including at least one inter merge candidate and at least one intra merge candidate.

In a specific example, when the inter prediction using the intra merge candidate is possible, the video decoding apparatus 100 may determine the merge candidate list 700 including the inter merge candidates MV1, MV2, MV3, MV4, . . . , VMm, and the inter-intra merge candidates IPM1&MV1, IPM2&MV1, IPM1&MV2, IPM2&MV2, . . . , IPMn&MVm.

The video decoding apparatus 100 may perform the inter prediction by using one candidate indicated by the merge candidate index among the inter merge candidates and the inter-intra merge candidates included in the merge candidate list 700.

In addition, when the inter prediction using the intra merge candidate is possible, the video encoding apparatus 200 may determine the merge candidate list 700 including the inter merge candidates MV1, MV2, MV3, MV4, . . . , VMm, and the inter-intra merge candidates IPM1&MV1, IPM2&MV1, IPM1&MV2, IPM2&MV2, . . . , IPMn&MVm. The video encoding apparatus 200 may encode the merge candidate index indicating one candidate used for the inter prediction among the inter merge candidates and the inter-intra merge candidates included in the merge candidate list 700.

Figure 8:
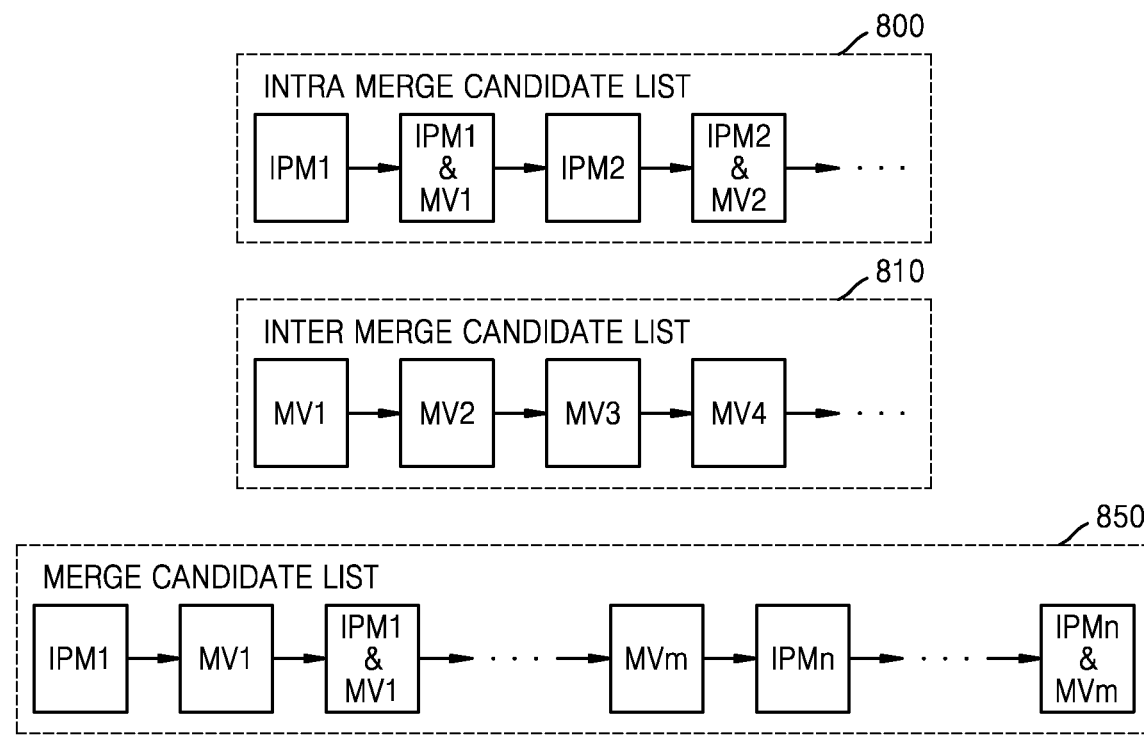
FIG. 8 illustrates an intra merge candidate list including an inter merge candidate, an intra merge candidate, and an inter-intra merge candidate, according to an embodiment.

FIG. 8 illustrates an intra merge candidate list including an inter merge candidate, an intra merge candidate, and an inter-intra merge candidate, according to an embodiment.

When the inter prediction using the intra merge candidate is possible, the video decoding apparatus 100 according to the embodiment may use the merge candidate list including the inter merge candidate, the intra merge candidate, and the inter-intra merge candidate.

In a specific example, when the inter prediction using the intra merge candidate can be performed in the skip mode or the merge mode, the video decoding apparatus 100 in FIG. 8 may determine an inter merge candidate list 810 including inter merge candidates MV1, MV2, MV3, . . . , MVm and an intra merge candidate list 800 including at least one intra merge candidate IPM1 and IPM2 and at least one inter-intra merge candidate IPM1&MV1 and IPM2&MV2.

The video decoding apparatus 100 may perform the inter prediction by using one candidate indicated by the merge candidate index among the inter merge candidates included in the inter merge candidate list 810 and the intra merge candidates and the inter-intra merge candidates included in the intra merge candidate list 800.

In addition, when the inter prediction using the intra merge candidate can be performed in the skip mode or the merge mode, the video encoding apparatus 200 may determine the inter merge candidate list 810 including the inter merge candidates MV1, MV2, MV3, . . . , MVm and the intra merge candidate list 800 including the intra merge candidates IPM1 and IPM2 and the inter-intra merge candidates IPM1&MV1 and IPM2&MV2. The video encoding apparatus 200 may encode the merge candidate index indicating one candidate used for the inter prediction among the inter merge candidates included in the inter merge candidate list 810 and the intra merge candidates and the inter-intra merge candidates included in the intra merge candidate list 800.

In another specific example, when the inter prediction using the intra merge candidate can be performed in the skip mode or the merge mode, the video decoding apparatus 100 may determine an inter merge candidate list 850 including the intra merge candidates IPM1, IPM2, . . . , IPMn, the inter merge candidates MV1, MV2, . . . , MVm, and the inter-intra merge candidates IPM1&MV1, IPM2&MV1, . . . , IPMn&MVm.

The video decoding apparatus 100 may perform the inter prediction by using one candidate indicated by the merge candidate index among the inter merge candidates, the intra merge candidates, and the inter-intra merge candidates included in the merge candidate list 850.

In addition, when the inter prediction using the intra merge candidate can be performed in the skip mode or the merge mode, the video encoding apparatus 200 may determine the inter merge candidate list 850 including the intra merge candidates IPM1, IPM2, . . . , IPMn, the inter merge candidates MV1, MV2, . . . , MVm, and the inter-intra merge candidates IPM1&MV1, IPM2&MV1, . . . , IPMn&MVm. The video encoding apparatus 200 may encode the merge candidate index indicating one candidate used for the inter prediction among the inter merge candidates, the intra merge candidates, and the inter-intra merge candidates included in the merge candidate list 850.

The method of determining the merge candidate list including the inter merge candidate, the intra merge candidate, and the inter-intra merge candidate, according to various embodiments will be described with reference to FIGS. 4, 5, 6A, 6B, 6C, 7, and 8. However, it should be understood that the embodiments disclosed herein are only specific examples for the purpose of understanding, and should not be construed as limiting the technical scope proposed in the present disclosure.

In addition, the merge candidate index may be defined according to the order of the inter merge candidate, the intra merge candidate, and the inter-intra merge candidate included in the merge candidate lists illustrated in FIGS. 4, 5, 6A, 6B, 6C, 7, and 8, but are not necessarily limited to the order drawn in the drawings.

According to an embodiment, the priority order between the inter merge candidate, the intra merge candidate, and the inter-intra merge candidate may be previously determined. For example, since the merge candidate list is provided for performing the inter prediction in the skip mode or the merge mode, the inter merge candidate may be preferentially included in the merge candidate list, and a merge candidate index having high priority may be assigned to the inter merge candidate.

In a specific example, at least one inter merge candidate, at least one intra merge candidate, and at least one inter-intra merge candidate may be included in the merge candidate list in this order, or at least one inter merge candidate, at least one inter-intra merge candidate, and at least one intra merge candidate may be included in the merge candidate list in this order.

In another example, the first inter merge candidate, the first intra merge candidate, the first inter-intra merge candidate, the second inter merge candidate, the second intra merge candidate, the second inter-intra merge candidate, . . . may be included in the merge candidate list in this order, or the first inter merge candidate, the first inter-intra merge candidate, the first intra merge candidate, the second inter merge candidate, the second inter-intra merge candidate, the second intra merge candidate, . . . may be included in the merge candidate list in this order.

In addition, when determining the prediction mode, the video encoding apparatus 200 may set the priority order to the inter prediction mode using the intra merge candidate rather than the intra prediction mode.

FIG. 9 illustrates a syntax for signalling intra merge information, according to an embodiment.

The video decoding apparatus 100 may parse a skip flag, a merge flag, and intra merge information from a bitstream according to the syntax illustrated in FIG. 9.

For example, the video decoding apparatus 100 may parse a skip flag "cu_skip_flag[ ][ ]" from a coding unit syntax "coding_unit( )" and determine whether a current coding unit has been predicted in a skip mode. When the current coding unit is not predicted in the skip mode, the video decoding apparatus 100 may parse an intra skip flag "intra_skip_flag[ ][ ]" from the coding unit syntax "coding_unit( )" and determine whether the current coding unit has been predicted in an intra skip mode.

When the current coding unit is decoded in the skip mode or the intra prediction mode, the video decoding apparatus 100 may call a prediction unit syntax "prediction_unit( )", parse a merge candidate index "merge_idx[ ][ ]" from a prediction unit syntax "prediction_unit( )", and select one candidate indicated by a merge candidate index "merge_idx [ ]" in a merge candidate list when the current coding unit is decoded in the skip mode or the intra skip mode.

When the current coding unit is predicted in the skip mode or the intra skip mode, residual data is not parsed. Therefore, prediction values according to neighboring blocks indicated by the merge candidate index may be reconstructed as the sample value of the current coding unit as it is.

In addition, when the mode is not the skip mode or the intra prediction mode, the video decoding apparatus 100 may call a prediction unit syntax "prediction_unit ( )", parse a merge flag "merge_flag[ ][ ]" from a prediction unit syntax "prediction_unit( )" when the current coding unit is decoded in an inter mode, and determine whether the current prediction unit is decoded in an inter merge mode using only an inter merge candidate. When the current prediction unit is not decoded in the inter merge mode, the video decoding apparatus 100 may further parse an intra merge flag "intra_merge_flag[ ][ ]" and determine whether the current prediction unit is decoded in the merge mode capable of using the intra merge candidate. When the intra merge candidate is available, the video decoding apparatus 100 may further parse a merge candidate index "merge_idx[ ][ ]" from a prediction unit syntax "prediction_unit( )", and select one candidate indicated by a merge candidate index "merge_idx[ ]" in a merge candidate list. At this time, since the intra merge candidate is available, the candidate indicated by the merge candidate index may be one of the inter merge candidate, the intra merge candidate, and the inter-intra merge candidate.

In addition, when the video decoding apparatus 100 performs prediction on the current block in the inter mode or the intra skip mode using the intra merge candidate, the motion vector of the current block is not defined as a result of predicting the current block. In this case, the motion vector of the current block has to be referred to when a motion vector prediction for a next block is performed, but the motion vector of the current block is in an unavailable state. Therefore, after the video decoding apparatus 100 according to the embodiment determines the prediction block of the current block by performing prediction on the current block in the intra mode or the intra skip mode using the intra merge candidate, the video decoding apparatus 100 may set the motion vector of the current block for the motion vector prediction of the next block to the zero vector or the motion vector of the neighboring block.

In the operation of the video decoding apparatus 100 and the operation of the video encoding apparatus 200, which have been described with reference to FIGS. 1 through 9, the block may be a coding unit, a sub-block of a coding unit, or a data unit such as a largest coding unit. For example, the sub-block may be a prediction unit that is a block determined by dividing a coding unit so as to perform prediction on the coding unit, a transformation unit determined by dividing a coding unit so as to perform transformation and quantization on the coding unit, and the like.

Hereinafter, a method of determining a data unit of an image, according to an embodiment, will be described with reference to FIGS. 10 through 23.

Figure 10:
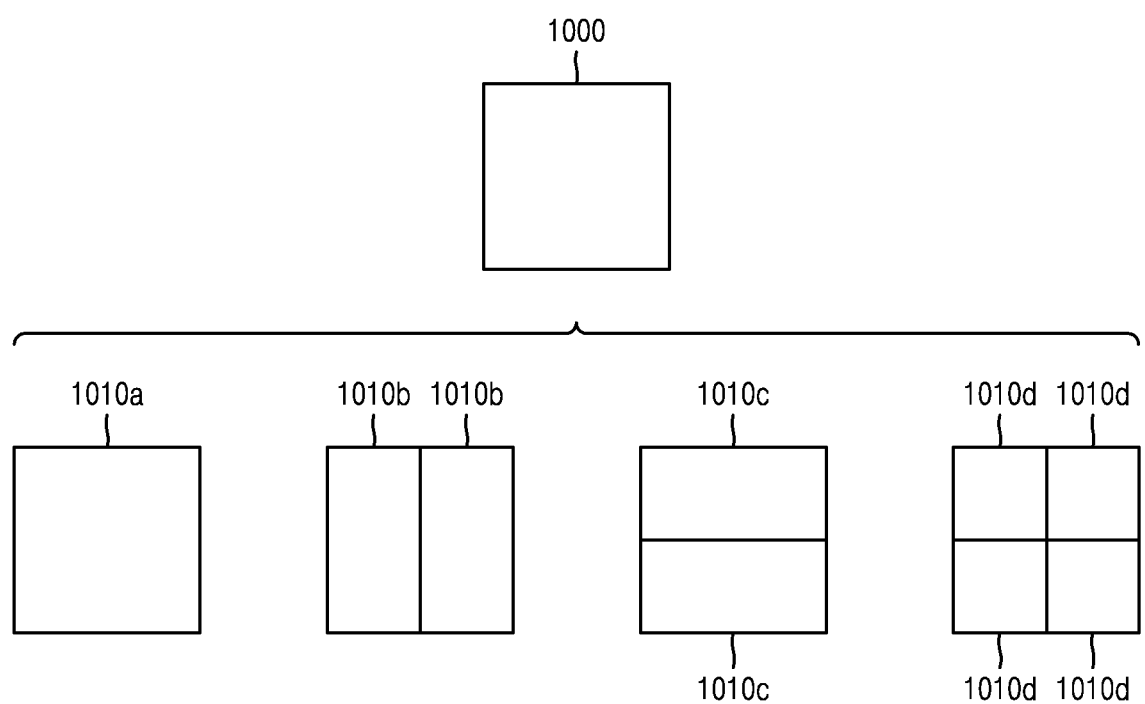
FIG. 10 illustrates processes of determining at least one coding unit as a current coding unit is split, according to an embodiment.

FIG. 10 illustrates processes of determining at least one coding unit as the video decoding apparatus 100 splits a current coding unit, according to an embodiment.

According to an embodiment, the video decoding apparatus 100 may determine a shape of a coding unit by using block shape information, and determine a shape into which a coding unit is split by using split shape information. In other words, a split configuration of a coding unit, which is indicated by the split shape information, may be determined based on a block shape indicated by the block shape information used by the video decoding apparatus 100.

According to an embodiment, the video decoding apparatus 100 may use block shape information indicating that a current coding unit has a square shape. For example, the video decoding apparatus 100 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the decoder 120 may not split a coding unit 1010a having the same size as the current coding unit 1000 according to split shape information indicating non-split, or determine coding units 1010b, 1010c, or 1010d based on split shape information indicating a certain split configuration.

Referring to FIG. 10, the video decoding apparatus 100 may determine two coding units 1010b by splitting the current coding unit 1000 in a vertical direction based on split shape information indicating a split in a vertical direction, according to an embodiment. The video decoding apparatus 100 may determine two coding units 1010c by splitting the current coding unit 1000 in a horizontal direction based on split shape information indicating a split in a horizontal direction. The video decoding apparatus 100 may determine four coding units 1010d by splitting the current coding unit 1000 in vertical and horizontal directions based on split shape information indicating splitting in vertical and horizontal directions. However, a split shape into which a square coding unit may be split is not limited to the above shapes, and may include any shape indicatable by split shape information. Certain split shapes into which a square coding unit are split will now be described in detail through various embodiments.

FIG. 11 illustrates processes of determining at least one coding unit when the video decoding apparatus 100 splits a coding unit having a non-square shape, according to an embodiment.

According to an embodiment, the video decoding apparatus 100 may use block shape information indicating that a current coding unit has a non-square shape. The video decoding apparatus 100 may determine, according to split shape information, whether to not split the non-square current coding unit or to split the non-square current coding unit according to a certain configuration. Referring to FIG. 11, when block shape information of a current coding unit 1100 or 1150 indicates a non-square shape, the video decoding apparatus 100 may not split coding units 1110 or 1160 having the same size as the current coding unit 1100 or 1150 according to split shape information indicating non-split, or determine coding units 1120a, 1120b, 1130a, 1130b, 1130c, 1170a, 1170b, 1180a, 1180b, and 1180c based on split shape information indicating a certain split configuration. A certain split configuration of splitting a non-square coding unit will now be described in detail through various embodiments.

According to an embodiment, the video decoding apparatus 100 may determine a shape into which a coding unit is split by using split shape information, and in this case, the split shape information may indicate the number of at least one coding unit generated as the coding unit is split. Referring to FIG. 11, when split shape information indicates that the current coding unit 1100 or 1150 is split into two coding units, the video decoding apparatus 100 may determine two coding units 1120a and 1120b or 1170a and 1170b included in the current coding unit 1100 or 1150 by splitting the current coding unit 1100 or 1150 based on the split shape information.

According to an embodiment, when the video decoding apparatus 100 splits the current coding unit 1100 or 1150 having a non-square shape based on split shape information, the video decoding apparatus 100 may split the current coding unit 1100 or 1150 considering locations of long sides of the current coding unit 1100 or 1150 having a non-square shape. For example, the video decoding apparatus 100 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the video decoding apparatus 100 may determine the odd number of coding units included in the current coding unit 1100 or 1150. For example, when split shape information indicates that the current coding unit 1100 or 1150 is split into three coding units, the video decoding apparatus 100 may split the current coding unit 1100 or 1150 into three coding units 1130a through 1130c or 1180a through 1180c. According to an embodiment, the video decoding apparatus 100 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is split may have a plurality of types of sizes, and in some cases, the coding units 1130a through 1130c or 1180a through 1180c may have different sizes.

According to an embodiment, when split shape information indicates that a coding unit is split into an odd number of blocks, the video decoding apparatus 100 may determine the odd number of coding units included in the current coding unit 1100 or 1150, and in addition, may set a certain limit on at least one coding unit from among the odd number of coding units generated via splitting. Referring to FIG. 11, the video decoding apparatus 100 may differentiate decoding processes performed on the coding unit 1130b or 1180b located at the center from among the three coding units 1130a through 1130c or 1180a through 1180c generated as the current coding unit 1100 or 1150 is split from the other coding units 1130a and 1130c or 1180a and 1180c. For example, the video decoding apparatus 100 may limit the coding unit 1130b or 1180b located at the center to be no longer split unlike the other coding units 1130a and 1130c or 1180a and 1180c, or to be split only a certain number of times.

Figure 12:
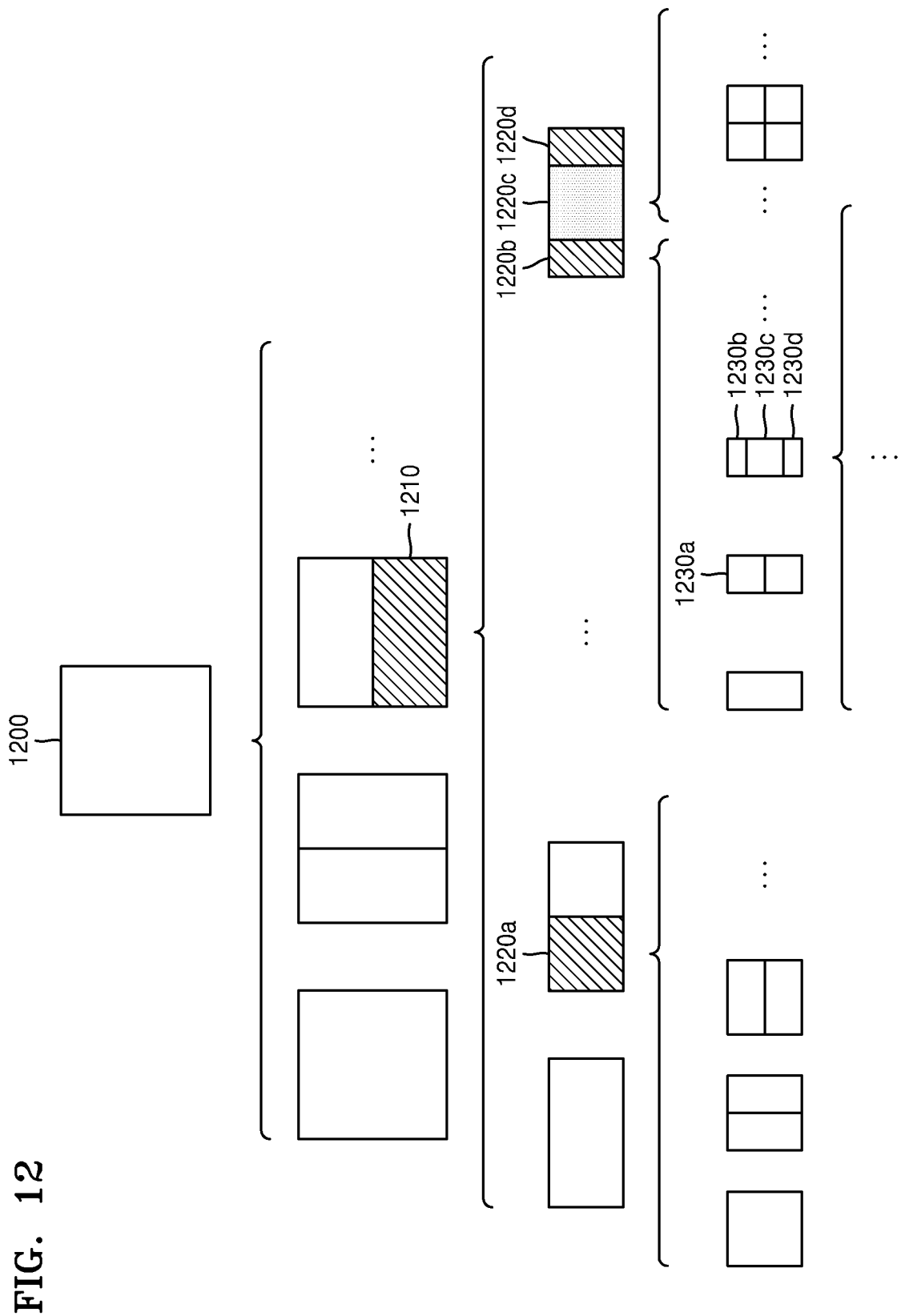
FIG. 12 illustrates processes of splitting a coding unit, based on at least one of a block shape information and split shape information, according to an embodiment.

FIG. 12 illustrates processes of the video decoding apparatus 100 splitting a coding unit, based on at least one of a block shape information and split shape information, according to an embodiment.

According to an embodiment, the video decoding apparatus 100 may determine that a first coding unit 1200 having a square shape is split or not split into coding units, based on at least one of block shape information and split shape information. According to an embodiment, when split shape information indicates that the first coding unit 1200 is split in a horizontal direction, the video decoding apparatus 100 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the video decoding apparatus 100 may determine that the determined second coding unit 1210 is split or not split into coding units based on at least one of block shape information and split shape information. Referring to FIG. 12, the video decoding apparatus 100 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split shape information. The video decoding apparatus 100 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information. According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220*a* through 1220*d*) based on at least one of block shape information and split shape information with respect to the second coding unit 1210. In other words, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220*b* through 1220*d* determined when the second coding unit 1210 having a non-square shape is split may be recursively split. According to an embodiment, the third coding unit 1220*c* having a square shape from among the third coding units 1220*b* through 1220*d* may be split in a horizontal direction into a plurality of fourth coding units. A fourth coding unit having a non-square shape from among the plurality of fourth coding units may again be split into a plurality of coding units. For example, the fourth coding unit 1240 having a non-square shape may be split into an odd number of coding units.

A method that may be used to recursively split a coding unit will be described below through various embodiments.

According to an embodiment, the video decoding apparatus 100 may determine that each of the third coding units 1220*a* through 1220*d* is split into coding units or that the second coding unit 1210 is not split, based on at least one of block shape information and split shape information. The video decoding apparatus 100 may split the second coding unit 1210 having a non-square shape into the odd number of third coding units 1220*b* through 1220*d*, according to an embodiment. The video decoding apparatus 100 may set a certain limit on a certain third coding unit from among the third coding units 1220*b* through 1220*d*. For example, the video decoding apparatus 100 may limit that the third coding unit 1220*c* located at the center of the third coding units 1220*b* through 1220*d* is no longer split, or is split into a settable number of times. Referring to FIG. 12, the video decoding apparatus 100 may limit that the third coding unit 1220*c* located at the center of the third coding units 1220*b* through 1220*d* included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220*c* located at the center are only examples and should not be interpreted as being limited by those examples, but should be interpreted as including various limits as long as the third coding unit 1220*c* located at the center are decoded differently from the other third coding units 1220*b* and 1220*d*.

According to an embodiment, the video decoding apparatus 100 may obtain at least one of block shape information and split shape information used to split a current coding unit from a certain location in the current coding unit.

Figure 13:
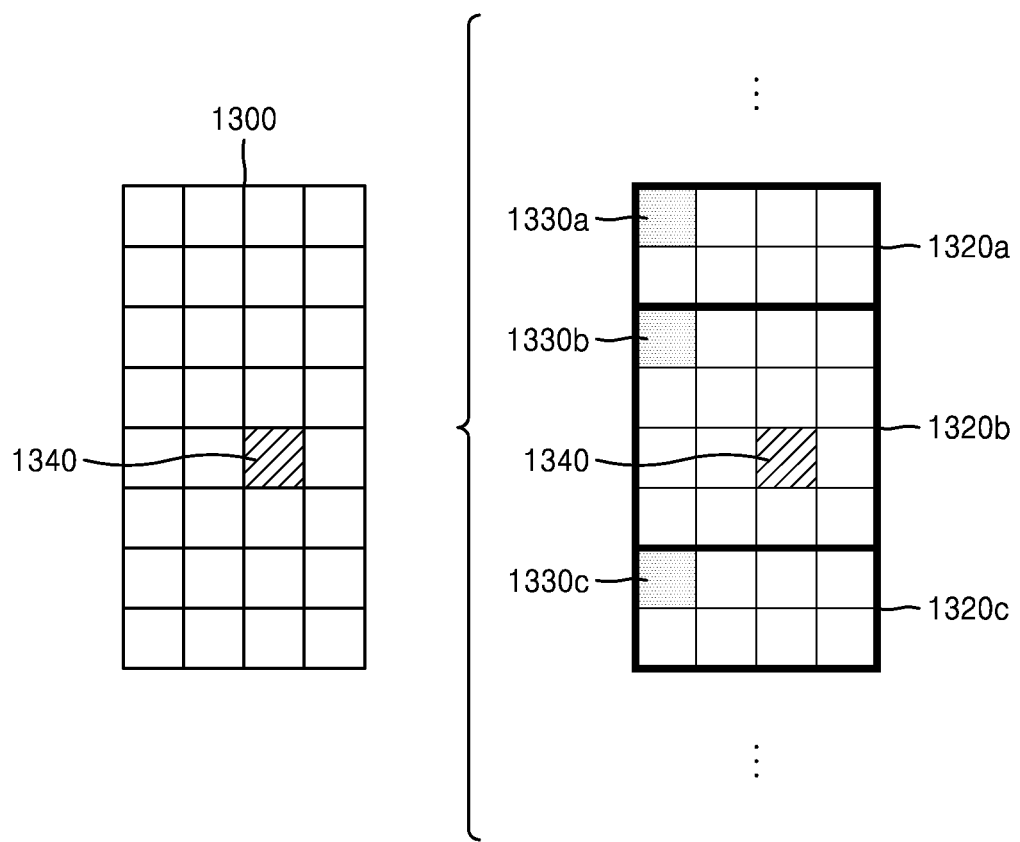
FIG. 13 illustrates a method of determining a certain coding unit from among an odd number of coding units, according to an embodiment.

FIG. 13 illustrates a method of determining, by the video decoding apparatus 100, a certain coding unit from among an odd number of coding units, according to an embodiment.

Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The video decoding apparatus 100 may determine that a current coding unit is split into coding units having various shapes and sizes or is not split by obtaining at least one of block shape information and split shape information from a certain location.

According to an embodiment, the video decoding apparatus 100 may select one coding unit when a current coding unit is split into a certain number of coding units. A method of selecting one of a plurality of coding units may vary, and details thereof will be described below through various embodiments.

According to an embodiment, the video decoding apparatus 100 may split a current coding unit into a plurality of coding units, and determine a coding unit at a certain location.

FIG. 13 illustrates a method of determining, by the video decoding apparatus 100, a coding unit at a certain location from among an odd number of coding units, according to an embodiment.

According to an embodiment, the video decoding apparatus 100 may use information indicating a location of each of the odd number of coding units so as to determine a coding unit located at the center from among the odd number of coding units. Referring to FIG. 13, the video decoding apparatus 100 may determine the odd number of coding units 1320*a* through 1320*c* by splitting the current coding unit 1300. The video decoding apparatus 100 may determine the center coding unit 1320*b* by using information about the locations of the odd number of coding units 1320*a* through 1320*c*. For example, the video decoding apparatus 100 may determine the coding unit 1320*b* located at the center by determining the locations of the coding units 1320*a* through 1320*b* based on information indicating locations of certain samples included in the coding units 1320*a* through 1320*c*. In detail, the video decoding apparatus 100 may determine the coding unit 1320*b* located at the center by determining the locations of the coding units 1320*a* through 1320*c* based on information indicating locations of upper left samples 1330*a* through 1330*c* of the coding units 1320*a* through 1320*c*.

According to an embodiment, the information indicating the locations of the upper left samples 1330*a* through 1330*c* included in the coding units 1320*a* through 1320*c* respectively may include information about a location or coordinates of the coding units 1320*a* through 1320*c* in a picture. According to an embodiment, the information indicating the locations of the upper left samples 1330*a* through 1330*c* included in the coding units 1320*a* through 1320*c* respectively may include information indicating widths or heights of the coding units 1320*a* through 1320*c* included in the current coding unit 1300, and such widths or heights may correspond to information indicating differences between coordinates of the coding units 1320*a* through 1320*c* in a picture. In other words, the video decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The video decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the video decoding apparatus 100 may split the current coding unit 1300 into the plurality of coding units 1320a through 1320c, and select a coding unit from the coding units 1320a through 1320c according to a certain standard. For example, the video decoding apparatus 100 may select the coding unit 1320b having a different size from among the coding units 1320a through 1320c.

According to an embodiment, the video decoding apparatus 100 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The video decoding apparatus 100 may determine the sizes of the coding units 1320a through 1320c by respectively using the coordinates (xa, ya), (xb, yb), and (xc, yc) indicating the locations of the coding units 1320a through 1320c.

According to an embodiment, the video decoding apparatus 100 may determine the width of the upper coding unit 1320a to be xb-xa, and the height to be yb-ya. According to an embodiment, the video decoding apparatus 100 may determine the width of the center coding unit 1320b to be xc-xb, and the height to be yc-yb. According to an embodiment, the video decoding apparatus 100 may determine the width or height of the lower coding unit 1320c by using the width and height of the current coding unit 1300 and the widths and heights of the upper coding unit 1320a and center coding unit 1320b. The video decoding apparatus 100 may determine a coding unit having a different size from other coding units based on the determined widths and heights of the coding units 1320a through 1320c. Referring to FIG. 13, the video decoding apparatus 100 may determine the center coding unit 1320b having a size different from those of the upper coding unit 1320a and lower coding unit 1320c as a coding unit at a certain location. However, processes of the video decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the video decoding apparatus 100 may select a coding unit at a certain location from among an odd number of coding units determined when a current coding unit is split, while considering a shape of the current coding unit. For example, when the current coding unit has a non-square shape in which a width is longer than a height, the video decoding apparatus 100 may determine a coding unit at a certain location in a horizontal direction. In other words, the video decoding apparatus 100 may determine one of coding units having a different location in the horizontal direction and set a limit on the one coding unit. When the current coding unit has a non-square shape in which a height is longer than a width, the video decoding apparatus 100 may determine a coding unit at a certain location in a vertical direction. In other words, the video decoding apparatus 100 may determine one of coding units having a different location in the vertical direction and set a limit on the one coding unit.

According to an embodiment, the video decoding apparatus 100 may use information indicating a location of each of an even number of coding units so as to determine a coding unit at a certain location from among the even number of coding units. The video decoding apparatus 100 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the video decoding apparatus 100 may use at least one of block shape information and split shape information stored in a sample included in a center coding unit during splitting processes so as to determine a coding unit located at the center from among a plurality of coding units obtained by splitting a current coding unit.

Referring to FIG. 13, the video decoding apparatus 100 may split the current coding unit 1300 into the plurality of coding units 1320a through 1320c based on at least one of block shape information and split shape information, and determine the coding unit 1320b located at the center from among the plurality of coding units 1320a through 1320c. In addition, the video decoding apparatus 100 may determine the coding unit 1320b located at the center considering a location from which at least one of the block shape information and the split shape information is obtained. In other words, at least one of the block shape information and the split shape information of the current coding unit 1300 may be obtained from the sample 1340 located at the center of the current coding unit 1300, and when the current coding unit 1300 is split into the plurality of coding units 1320a through 1320c based on at least one of the block shape information and the split shape information, the coding unit 1320b including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the video decoding apparatus 100 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is split. In other words, the video decoding apparatus 100 may determine the sample at the certain location considering a block shape of the current coding unit 1300, and determine and set a certain limit on the coding unit 1320b including a sample from which certain information (for example, at least one of block shape information and split shape information) is obtainable, from among the plurality of coding units 1320a through 1320c determined when the current coding unit 1300 is split. Referring to FIG. 13, according to an embodiment, the video decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the video decoding apparatus 100 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the video decoding apparatus 100 may determine, as a sample from which certain information is obtainable, one of samples adjacent to a boundary of splitting long sides of the current coding unit into halves.

According to an embodiment, when a current coding unit is split into a plurality of coding units, the video decoding apparatus 100 may use at least one of block shape information and split shape information so as to determine a coding unit at a certain location from among the plurality of coding units. According to an embodiment, the video decoding apparatus 100 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. In other words, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the video decoding apparatus 100 may determine at least one coding unit by splitting a current coding unit, and determine an order of decoding the at least one coding unit according to a certain block (for example, the current coding unit).

Figure 14:
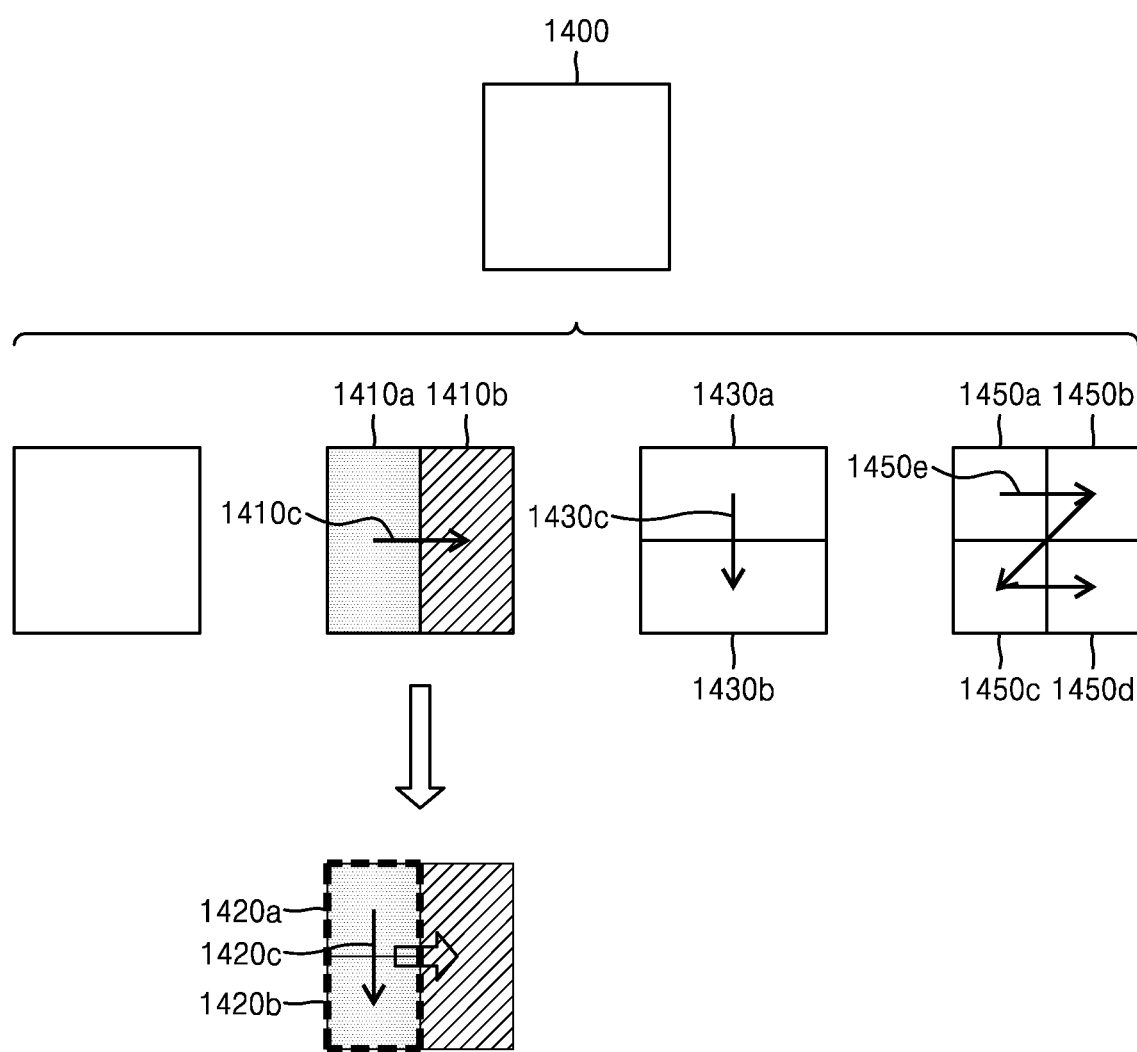
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the video decoding apparatus 100 splits a current coding unit, according to an embodiment.

According to an embodiment, the video decoding apparatus 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a through 1450d by splitting the first coding unit 140 in horizontal and vertical directions, according to block shape information and split shape information.

Referring to FIG. 14, the video decoding apparatus 100 may determine the second coding units 1410a and 1410b, which are determined by splitting the first coding unit 1400 in the vertical direction, to be processed in a horizontal direction 1410c. The video decoding apparatus 100 may determine the second coding units 1430a and 1430b, which are determined by splitting the first coding unit 1400 in the horizontal direction, to be processed in a vertical direction 1430c. The video decoding apparatus 100 may determine the second coding units 1450a through 1450d, which are determined by splitting the first coding unit 1400 in the vertical and horizontal directions to be processed according to a certain order in which coding units located in one row is processed and then coding units located in a next row is processed (for example, a raster scan order or a z-scan order 1450e).

According to an embodiment, the video decoding apparatus 100 may recursively split coding units. Referring to FIG. 14, the video decoding apparatus 100 may determine the plurality of second coding units 1410a and 1410b, 1430a and 1430b, or 1450a through 1450d by splitting the first coding unit 1400, and recursively split each of the plurality of second coding units 1410a and 1410b, 1430a and 1430b, or 1450a through 1450d. A method of splitting the plurality of second coding units 1410a and 1410b, 1430a and 1430b, or 1450a through 1450d may correspond to a method of splitting the first coding unit 1400. Accordingly, each of the plurality of second coding units 1410a and 1410b, 1430a and 1430b, or 1450a through 1450d may be independently split into a plurality of coding units. Referring to FIG. 14, the video decoding apparatus 100 may determine the second coding units 1410a and 1410b by splitting the first coding unit 1400 in the vertical direction, and in addition, determine that each of the second coding units 1410a and 1410b is independently split or not split.

According to an embodiment, the video decoding apparatus 100 may split the second coding unit 1410a at the left in a horizontal direction into third coding units 1420a and 1420b, and may not split the second coding unit 1410b at the right.

According to an embodiment, an order of processing coding units may be determined based on split processes of coding units. In other words, an order of processing coding units that are split may be determined based on an order of processing coding units before being split. The video decoding apparatus 100 may determine an order of processing the third coding units 1420a and 1420b determined when the second coding unit 1410a at the left is split independently from the second coding unit 1410b at the right. Since the third coding units 1420a and 1420b are determined when the second coding unit 1410a at the left is split in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being split, but such processes are not limited to the above embodiments, and any method of independently processing, in a certain order, coding units split into various shapes may be used.

Figure 15:
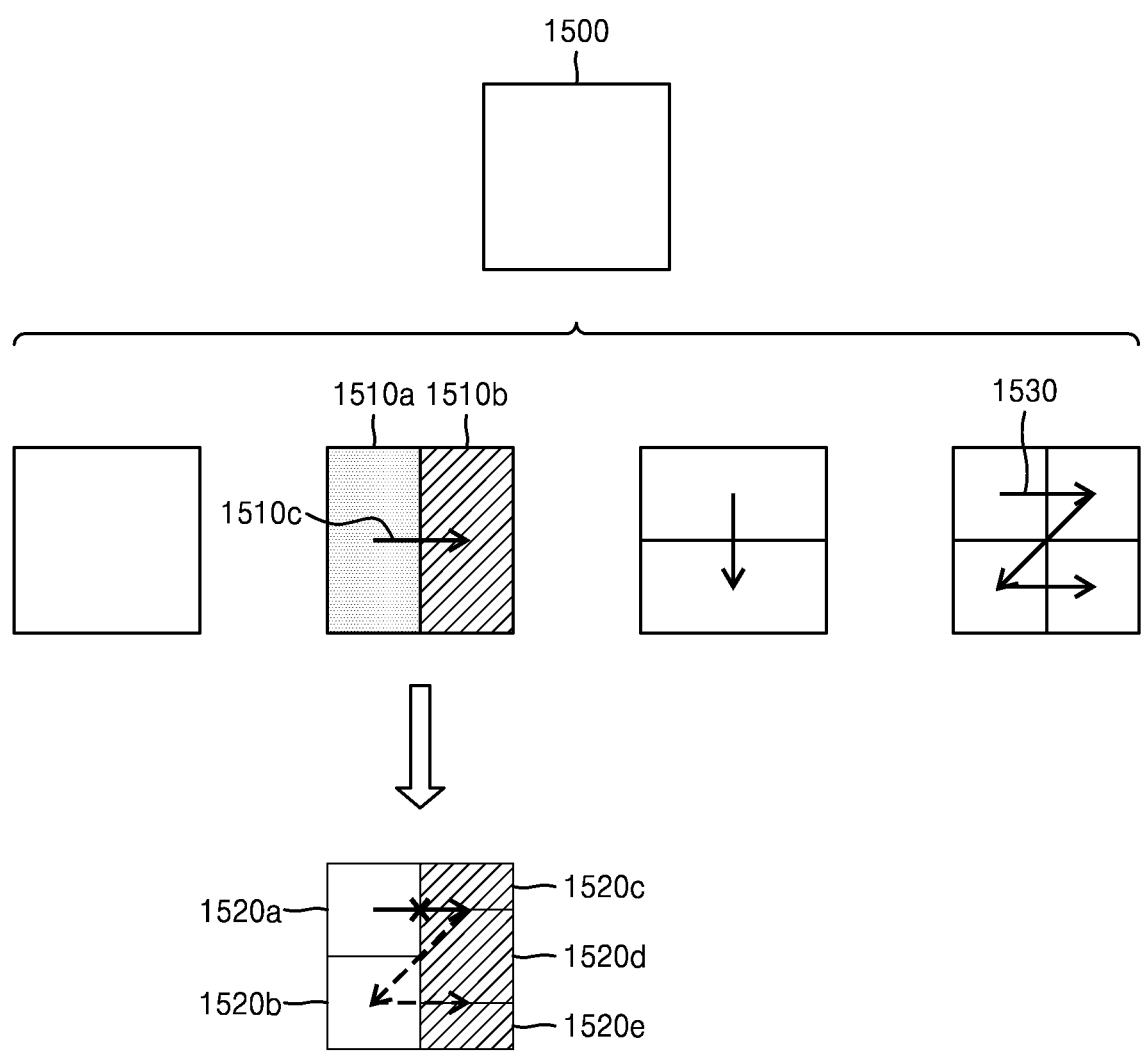
FIG. 15 illustrates processes of determining that a current coding unit is split into an odd number of coding units when a coding unit is not processable in a certain order, according to an embodiment.

FIG. 15 illustrates processes of determining that a current coding unit is split into an odd number of coding units when a coding unit is not processable in a certain order by the video decoding apparatus 100, according to an embodiment.

According to an embodiment, the video decoding apparatus 100 may determine that a current coding unit is split into an odd number of coding units based on obtained block shape information and split shape information. Referring to FIG. 15, a first coding unit 1500 having a square shape may be split into second coding units 1510a and 1510b having a non-square shape, and the second coding units 1510a and 1510b may be independently respectively split into third coding units 1520a and 1520b, and 1520c through 1520e. According to an embodiment, the video decoding apparatus 100 may split the second coding unit 1510a at the left from among the second coding units 1510a and 1510b into a horizontal direction to determine the plurality of third coding units 1520a and 1520b, and split the second coding unit 1510b at the right into the odd number of third coding units 1520c through 1520e.

According to an embodiment, the video decoding apparatus 100 may determine whether a coding unit split into an odd number exists by determining whether the third coding units 1520a through 1520e are processable in a certain order. Referring to FIG. 15, the video decoding apparatus 100 may determine the third coding units 1520a through 1520e by recursively splitting the first coding unit 1500. The video decoding apparatus 100 may determine, based on at least one of block shape information and split shape information, whether a coding unit is split into an odd number from among shapes into which the first coding unit 1500, the second coding units 1510a and 1510b, or the third coding units 1520a through 1520e are split. For example, the second coding unit 1510b at the right from among the second coding units 1510a and 1510b may be split into the odd number of third coding units 1520c through 1520e. An order of processing a plurality of coding units included in the first coding unit 1500 may be a certain order (for example, a z-scan order 1530), and the video decoding apparatus 100 may determine whether the third coding units 1520c through 1520e determined when the second coding unit 1510b at the right is split into an odd number satisfy a condition of being processable according to the certain order.

According to an embodiment, the video decoding apparatus 100 may determine whether the third coding units 1520a through 1520e included in the first coding unit 1500 satisfy a condition of being processable according to a certain order, wherein the condition is related to whether at least one of a width and a height of each of the second coding units 1510a and 1510b is split into halves according to boundaries of the third coding units 1520a through 1520e. For example, the third coding units 1520a and 1520b determined when the height of the second coding unit 1510a at the left and having a non-square shape is split into halves satisfy the condition, but it may be determined that the third coding units 1520c through 1520e do not satisfy the condition because the boundaries of the third coding units 1520c through 1520e that are determined when the second coding unit 1510b at the right is split into three coding units do not split the width or height of the second coding unit 1510b at the right into halves. The video decoding apparatus 100 may determine disconnection of a scan order when the condition is not satisfied, and determine that the second coding unit 1510b at the right is split into the odd number of coding units, based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

Figure 16:
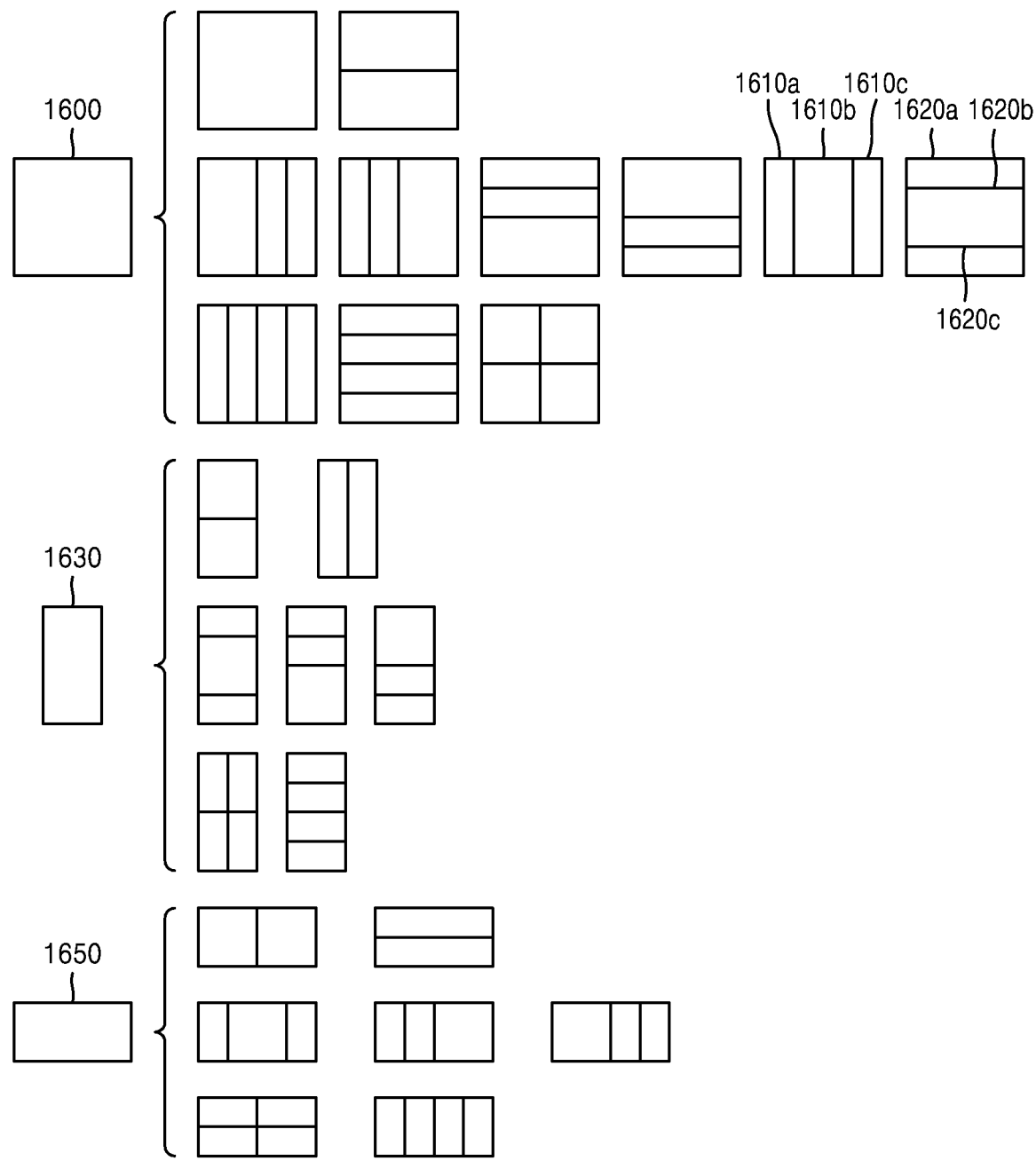
FIG. 16 illustrates processes of determining at least one coding unit when a first coding unit is split, according to an embodiment.

FIG. 16 illustrates processes of determining at least one coding unit when the video decoding apparatus 100 splits a first coding unit 1600, according to an embodiment. According to an embodiment, the video decoding apparatus 100 may split the first coding unit 1600 based on at least one of block shape information and split shape information. The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the video decoding apparatus 100 may split the first coding unit 1600 into a plurality of non-square coding units. In detail, when split shape information indicates that an odd number of coding units are determined by splitting the first coding unit 1600 in a horizontal direction or a vertical direction, the video decoding apparatus 100 may determine, as the odd number of coding units, second coding units 1610a through 1610c by splitting the first coding unit 1600 having a square shape in a vertical direction, or second coding units 1620a through 1620c by splitting the first coding unit 1600 in a horizontal direction.

According to an embodiment, the video decoding apparatus 100 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is split into halves according to boundaries of the second coding units 1610a through 1610c and 1620a through 1620c. Referring to FIG. 16, since the boundaries of the second coding units 1610a through 1610c determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is split in a horizontal direction do not split the height of the first coding unit 1600 into halves, it may be determined that the first coding unit 1600 does not satisfy the condition of being processable in a certain order. The video decoding apparatus 100 may determine disconnection of a scan order when the condition is not satisfied, and determine that the first coding unit 1600 is split into the odd number of coding units based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

According to an embodiment, the video decoding apparatus 100 may determine coding units having various shapes by splitting a first coding unit.

Referring to FIG. 16, the video decoding apparatus 100 may split the first coding unit 1600 having a square shape and a first coding unit 1630 or 1650 having a non-square shape into coding units having various shapes.

Figure 17:
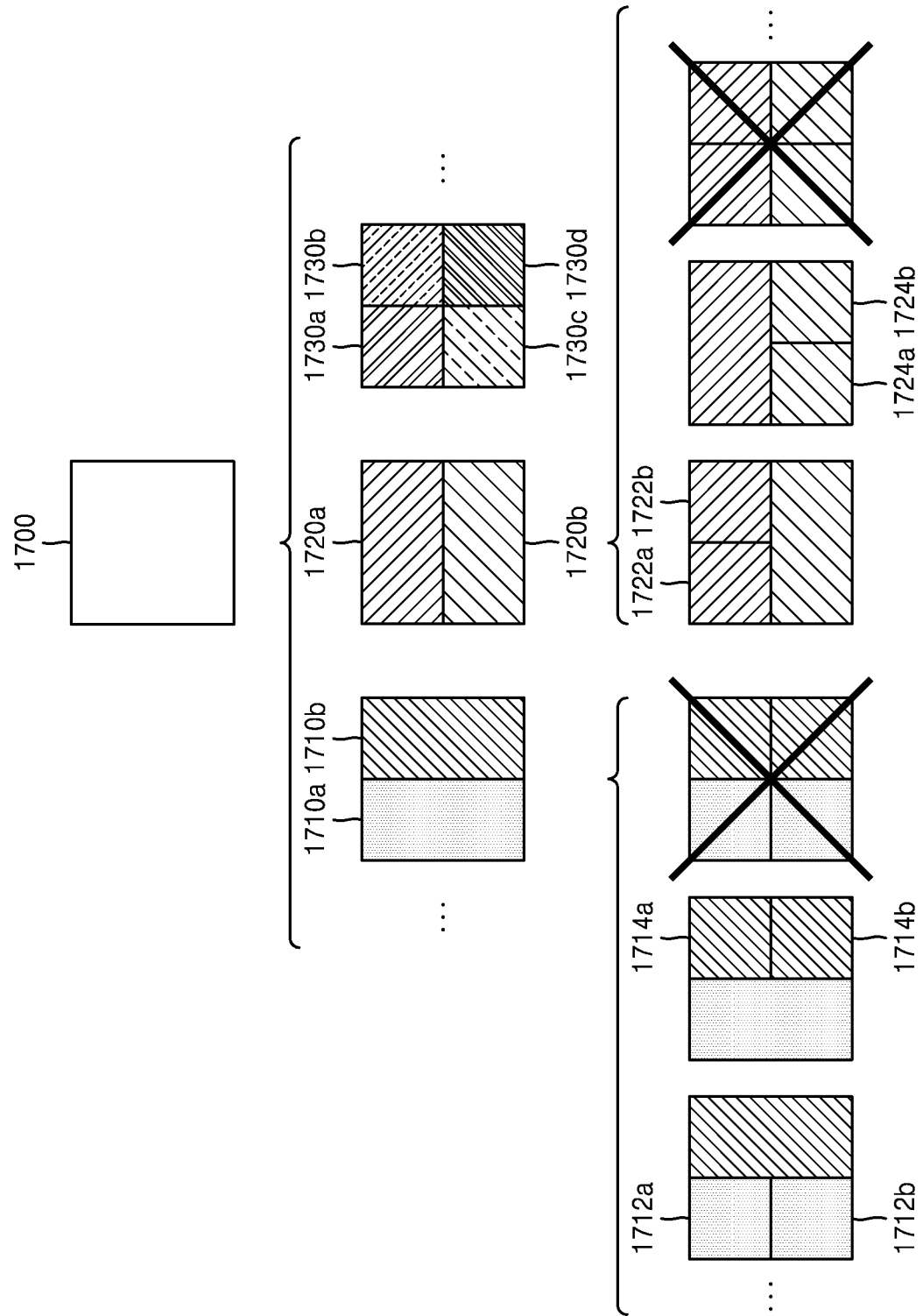
FIG. 17 illustrates that a shape into which a second coding unit is splittable is restricted when the second coding unit having a non-square shape determined when a first coding unit is split satisfies a certain condition, according to an embodiment.

FIG. 17 illustrates that a shape into which a second coding unit is splittable by the video decoding apparatus 100 is restricted when the second coding unit having a non-square shape determined when a first coding unit 1700 is split satisfies a certain condition, according to an embodiment.

According to an embodiment, the video decoding apparatus 100 may determine that the first coding unit 1700 having a square shape is split into second coding units 1710a and 1710b or 1720a and 1720b having a non-square shape, based on at least one of block shape information and split shape information. The second coding units 1710a and 1710b or 1720a and 1720b may be independently split. Accordingly, the video decoding apparatus 100 may determine that the second coding units 1710a and 1710b or 1720a and 1720b are split into a plurality of coding units or are not split based on at least one of block shape information and split shape information related to each of the coding units 1710a and 1710b or 1720a and 1720b. According to an embodiment, the video decoding apparatus 100 may determine third coding units 1712a and 1712b by splitting, in a horizontal direction, the second coding unit 1710a at the left having a non-square shape, which is determined when the first coding unit 1700 is split in a vertical direction. However, when the second coding unit 1710a at the left is split in the horizontal direction, the video decoding apparatus 100 may set a limit that the second coding unit 1710b at the right is not split in the horizontal direction like the second coding unit 1710a at the left. When third coding units 1714a and 1714b are determined when the second coding unit 1710b at the right is split in the same direction, i.e., the horizontal direction, the third coding units 1712a, 1712b, 1714a, and 1714b are determined when the second coding units 1710a at the left and the second coding unit 1710b at the right are each independently split in the horizontal direction. However, this is the same result as splitting the first coding unit 1700 into four second coding units 1730a through 1730d having a square shape based on at least one of block shape information and split shape information, and thus may be inefficient in terms of image decoding.

According to an embodiment, the video decoding apparatus 100 may determine third coding units 1722a and 1722b or 1724a, and 1724b by splitting, in a vertical direction, the second coding unit 1720a or 1720b having a non-square shape determined when the first coding unit 1700 is split in the horizontal direction. However, when one of second coding units (for example, the second coding unit 1720a at the top) is split in a vertical direction, the video decoding apparatus 100 may set a limit that the other second coding unit (for example, the second coding unit 1720b at the bottom) is not split in the vertical direction like the second coding unit 1720a at the top for the above described reasons.

Figure 18:
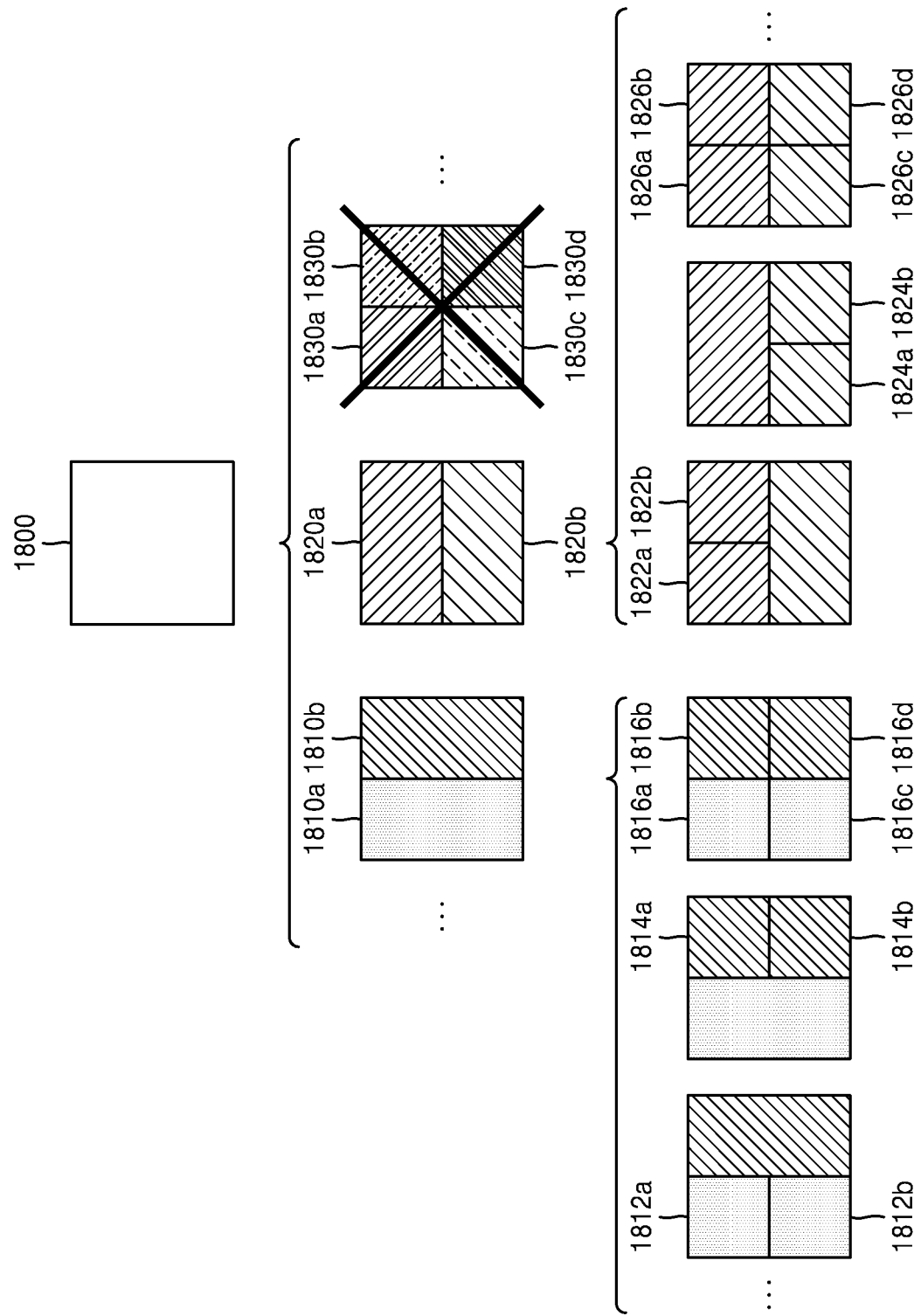
FIG. 18 illustrates processes of splitting a coding unit having a square shape when split shape information is unable to indicate that a coding unit is split into four square shapes, according to an embodiment.

FIG. 18 illustrates processes of the video decoding apparatus 100 splitting a coding unit having a square shape when split shape information is unable to indicate that a coding unit is split into four square shapes, according to an embodiment.

According to an embodiment, the video decoding apparatus 100 may determine second coding units 1810a and 1810b, or 1820a and 1820b, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the video decoding apparatus 100 is unable to split the first coding unit 1800 having a square shape into four second coding units 1830 through 1830d having a square shape. The video decoding apparatus 100 may determine the second coding units 1810a and 1810b, or 1820a and 1820b having a non-square shape based on the split shape information.

According to an embodiment, the video decoding apparatus 100 may independently split each of the second coding units 1810a and 1810b, or 1820a and 1820b having a non-square shape. Each of the second coding units 1810a and 1810b, or 1820a and 1820b may be split in a certain order via a recursive method that may be a split configuration corresponding to a method of splitting the first coding unit 1800 based on at least one of the block shape information and the split shape information.

For example, the video decoding apparatus 100 may determine third coding units 1812a and 1812b having a square shape by splitting the second coding unit 1810a at the left in a horizontal direction, or determine third coding units 1814a and 1814b having a square shape by splitting the second coding unit 1810b at the right in a horizontal direction. In addition, the video decoding apparatus 100 may determine third coding units 1816a through 1816d having a square shape by splitting both the second coding unit 1810a at the left and the second coding unit 1810b at the right in the horizontal direction. In this case, coding units may be determined in the same manner as when the first coding unit 1800 is split into four second coding units 1830a through 1830d having a square shape.

As another example, the video decoding apparatus 100 may determine third coding units 1822a and 1822b having a square shape by splitting the second coding unit 1820a at the top in a vertical direction, and determine third coding units 1824a and 1824b having a square shape by splitting the second coding unit 1820b at the bottom in a vertical direction. In addition, the video decoding apparatus 100 may determine third coding units 1826a through 1826d having a square shape by splitting both the second coding unit 1820a at the top and the second coding unit 1820b at the bottom in the vertical direction. In this case, coding units may be determined in the same manner as when the first coding unit 1800 is split into four second coding units 1830a through 1830d having a square shape.

Figure 19:
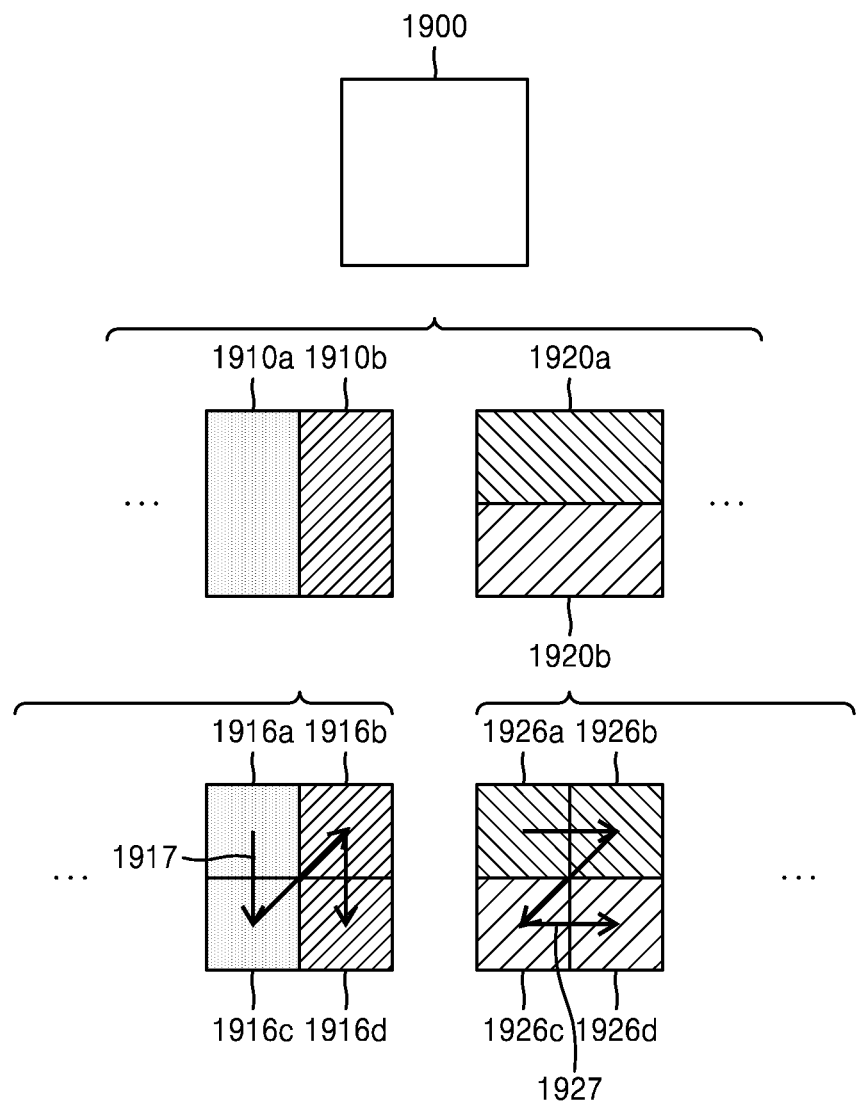
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the video decoding apparatus 100 may split a first coding unit 1900 based on block shape information and split shape information. When the block shape information indicates a square shape and the split shape information indicates that the first coding unit 1900 is split in at least one of a horizontal direction and a vertical direction, the video decoding apparatus 100 may split the first coding unit 1900 to determine second coding units 1910a and 1910b, or 1920a and 1920b. Referring to FIG. 19, the second coding units 1910a and 1910b, or 1920a and 1920b having a non-square shape and determined when the first coding unit 1900 is split in the horizontal direction or the vertical direction may each be independently split based on block shape information and split shape information. For example, the video decoding apparatus 100 may determine third coding units 1916a through 1916d by splitting, in the horizontal direction, each of the second coding units 1910a and 1910b generated as the first coding unit 1900 is split in the vertical direction, or determine third coding units 1926a through 1926d by splitting, in the horizontal direction, the second coding units 1920a and 1920b generated as the first coding unit 1900 is split in the vertical direction. Processes of splitting the second coding units 1910a and 1910b, or 1920a and 1920b have been described above with reference to FIG. 17, and thus details thereof are not provided again.

According to an embodiment, the video decoding apparatus 100 may process coding units according to a certain order. Features about processing coding units according to a certain order have been described above with reference to FIG. 14, and thus details thereof are not provided again. Referring to FIG. 19, the video decoding apparatus 100 may determine four third coding units 1916a through 1916d or 1926a through 1926d having a square shape by splitting the first coding unit 1900 having a square shape. According to an embodiment, the video decoding apparatus 100 may determine an order of processing the third coding units 1916a through 1916d or 1926a through 1926d based on how the first coding unit 1900 is split.

According to an embodiment, the video decoding apparatus 100 may determine the third coding units 1916a through 1916d by splitting, in the horizontal direction, the second coding units 1910a and 1910b generated as the first coding unit 1900 is split in the vertical direction, and process the third coding units 1916a through 1916d according to an order 1917 of first processing, in the vertical direction, the third coding units 1916a and 1916b included in the second coding unit 1910a at the left, and then processing, in the vertical direction, the third coding units 1916c and 1916d included in the second coding unit 1910b at the right.

According to an embodiment, the video decoding apparatus 100 may determine the third coding units 1926a through 1926d by splitting, in the vertical direction, the second coding units 1920a and 1920b generated as the first coding unit 1900 is split in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each split. The second coding units 1910a and 1910b determined when the first coding unit 1900 is split in the vertical direction and the second coding units 1920a and 1920b determined when the first coding unit 1900 is split in the horizontal direction are split in different shapes, but according to the third coding units 1916a through 1916d and 1926a through 1926d determined afterwards, the first coding unit 1900 is split in coding units having same shapes. Accordingly, the video decoding apparatus 100 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined when the coding unit is recursively split, according to an embodiment.

According to an embodiment, the video decoding apparatus 100 may determine a depth of a coding unit according to a certain standard. For example, the certain standard may be a length of a long side of the coding unit. When a length of a long side of a current coding unit is split $2n$ times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the video decoding apparatus 100 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by $1/2_1$ may have a size of N×N. In addition, the third coding unit 2004 determined by splitting a width and a height of the second coding unit 2002 by ½ may have a size of N/2× N/2. In this case, a width and a height of the third coding unit 2004 corresponds to ½ of the first coding unit 2000. When a depth of first coding unit 2000 is D, a depth of the second coding unit 2002 having $1/2_1$ of the width and the height of the first coding unit 2000 may be D+1, and a depth of the third coding unit 2004 having ½ of the width and the height of the first coding unit 2000 may be D+2.

According to an embodiment, the video decoding apparatus 100 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The video decoding apparatus 100 may determine a second coding unit (for example, the second coding unit 2002, 2012, or 2022) by splitting at least one of a width and a height of the first coding unit 2010 having a size of N×2N. In other words, the video decoding apparatus 100 may determine the second coding unit 2002 having a size of N×N or the second coding unit 2022 having a size of N×N/2 by splitting the first coding unit 2010 in a horizontal direction, or determine the second coding unit 2012 having a size of N/2× N by splitting the first coding unit 2010 in horizontal and vertical directions.

The video decoding apparatus 100 may determine a second coding unit (for example, the second coding unit 2002, 2012, or 2022) by splitting at least one of a width and a height of the first coding unit 2020 having a size of 2N×N. In other words, the video decoding apparatus 100 may determine the second coding unit 2002 having a size of N×N or the second coding unit 2012 having a size of N/2× N by splitting the first coding unit 200 in a vertical direction, or determine the second coding unit 2022 having a size of N×N/2 by splitting the first coding unit 2010 in horizontal and vertical directions.

According to an embodiment, the video decoding apparatus 100 may determine a third coding unit (for example, the third coding unit 2004, 2014, or 2024) by splitting at least one of a width and a height of the second coding unit 2002 having a size of N×N. In other words, the video decoding apparatus 100 may determine the third coding unit 2004 having a size of N/2×N/2, the third coding unit 2014 having a size of N/22×N/2, or the third coding unit 2024 having a size of N/2×N/22 by splitting the second coding unit 2002 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N/2×N. In other words, the video decoding apparatus 100 may determine the third coding unit 2004 having a size of N/2×N/2 or the third coding unit 2024 having a size of N/2×N/22 by splitting the second coding unit 2012 in a horizontal direction, or the third coding unit 2014 having a size of N/22×N/2 by splitting the second coding unit 2012 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N×N/2. In other words, the video decoding apparatus 100 may determine the third coding unit 2004 having a size of N/2×N/2 or the third coding unit 2014 having a size of N/22×N/2 by splitting the second coding unit 2022 in a vertical direction, or the third coding unit 2024 having a size of N/2×N/22 by splitting the second coding unit 2022 in vertical and horizontal directions.

According to an embodiment, the video decoding apparatus 100 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be ½ of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½ of the width and the height of the first coding unit 2010 or 202 may be D+2.

Figure 21:
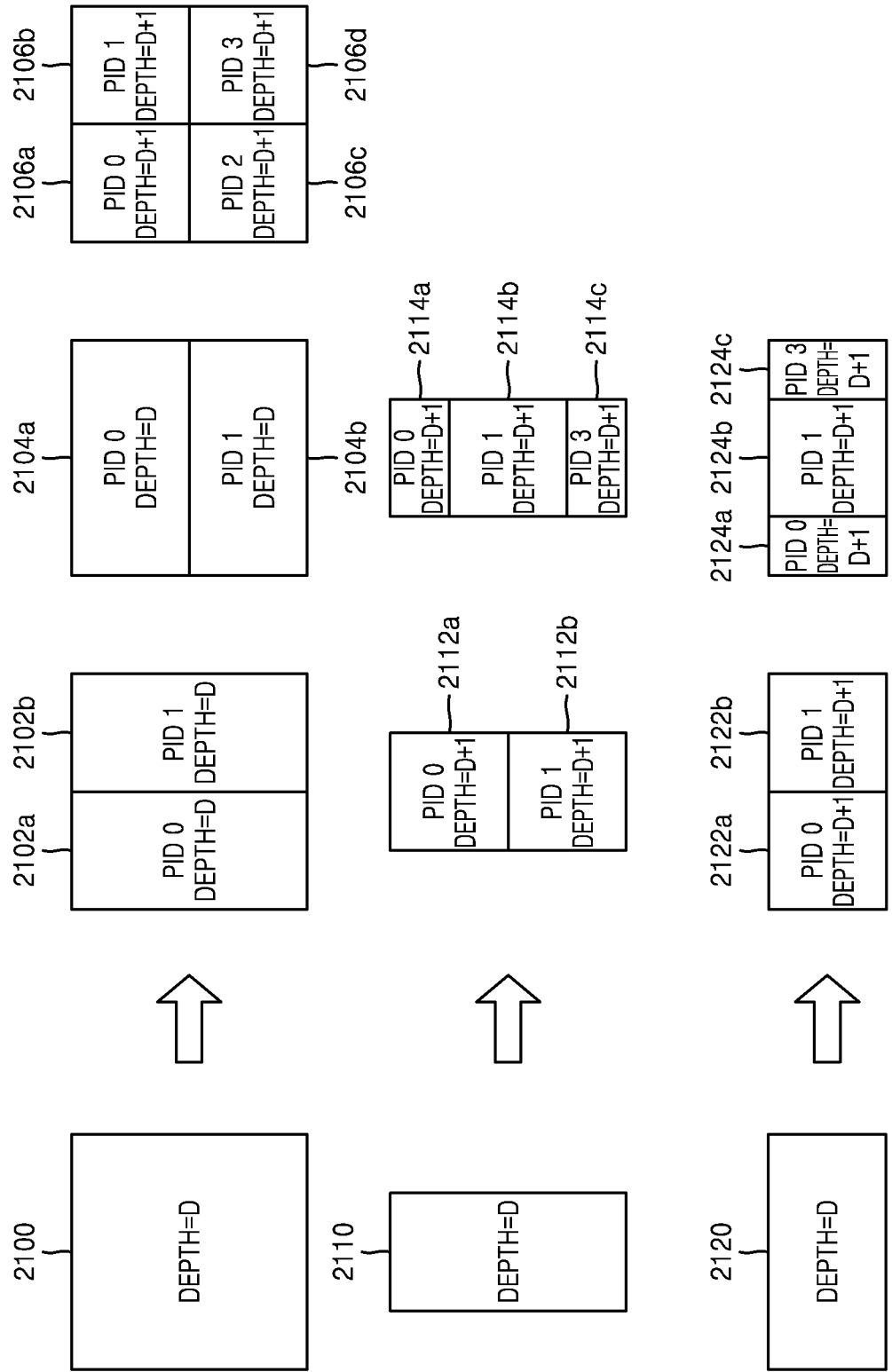
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the video decoding apparatus 100 may determine a second coding unit having various shapes by splitting a first coding unit 2100 having a square shape. Referring to FIG. 21, the video decoding apparatus 100 may determine second coding units 2102*a* and 2102*b*, 2104*a* and 2104*b*, or 2106*a* through 2106*d* by splitting the first coding unit 2100 in at least one of a vertical direction and a horizontal direction, according to split shape information. In other words, the video decoding apparatus 100 may determine the second coding units 2102*a* and 2102*b*, 2104*a* and 2104*b*, or 2106*a* through 2106*d* based on split shape information of the first coding unit 2100.

According to an embodiment, a depth of the second coding units 2102*a* and 2102*b*, 2104*a* and 2104*b*, or 2106*a* through 2106*d* determined according to the split shape information of the first coding unit 2100 having a square shape may be determined based on a length of a long side. For example, since a length of one side of the first coding unit 2100 having a square shape is the same as a length of a long side of the second coding units 2102*a* and 2102*b* or 2104*a* and 2104*b* having a non-square shape, the depths of the first coding unit 2100 and the second coding units 2102*a* and 2102*b* or 2104*a* and 2104*b* having a non-square shape may be the same, i.e., D. On the other hand, when the video decoding apparatus 100 splits the first coding unit 2100 into the four second coding units 2106*a* through 2106*d* having a square shape, based on the split shape information, a length of one side of the second coding units 2106*a* through 2106*d* having a square shape is ½ of the length of one side of the first coding unit 2100, the depths of the second coding units 2106*a* through 2106*d* may be D+1, i.e., a depth lower than the depth D of the first coding unit 2100.

According to an embodiment, the video decoding apparatus 100 may split a first coding unit 2110, in which a height is longer than a width, in a horizontal direction into a plurality of second coding units 2112*a* and 2112*b* or 2114*a* through 2114*c*, according to split shape information. According to an embodiment, the video decoding apparatus 100 may split a first coding unit 2120, in which a width is longer than a height, in a vertical direction into a plurality of second coding units 2122*a* and 2122*b* or 2124*a* through 2124*c*, according to split shape information.

According to an embodiment, depths of the second coding units 2112*a* and 2112*b*, 2114*a* through 2114*c*, 2122*a* and 2122*b*, or 2124*a* through 2124*c* determined according to the split shape information of the first coding unit 2110 or 2120 having a non-square shape may be determined based on a length of a long side. For example, since a length of one side of the second coding units 2112*a* and 2112*b* having a square shape is ½ of a length of a long side of the first coding unit 2110 having a non-square shape, in which the height is longer than the width, the depths of the second coding units 2112*a* and 2112*b* are D+1, i.e., depths lower than the depth D of the first coding unit 2110 having a non-square shape.

In addition, the video decoding apparatus 100 may split the first coding unit 2110 having a non-square shape into an odd number of second coding units 2114*a* through 2114*c*, based on split shape information. The odd number of second coding units 2114*a* through 2114*c* may include the second coding units 2114*a* and 2114*c* having a non-square shape, and the second coding unit 2114*b* having a square shape. In this case, since a length of a long side of the second coding units 2114*a* and 2114*c* having a non-square shape and a length of one side of the second coding unit 2114*b* having a square shape are ½ of a length of one side of the first coding unit 2110, depths of the second coding units 2114*a* through 2114*b* may be D+1, i.e., a depth lower than the depth D of the first coding unit 2110. The video decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the video decoding apparatus 100 may determine PIDs based on a size ratio of the coding units. Referring to FIG. 21, the second coding unit 2114*b* located at the center from the odd number of second coding units 2114*a* through 2114*c* may have the same width as the second coding units 2114*a* and 2114*c*, but have a height twice higher than those of the second coding units 2114*a* and 2114*c*. In this case, the second coding unit 2114*b* located at the center may include two of the second coding units 2114*a* and 2114*c*. Accordingly, when the PID of the second coding unit 2114*b* located at the center is 1 according to a scan order, the PID of the second coding unit 2114*c* in a next order may be 3, the PID having increased by 2. In other words, values of the PID may be discontinuous. According to an embodiment, the video decoding apparatus 100 may determine whether an odd number of coding units have the same sizes based on discontinuity of PID for distinguishing the coding units.

According to an embodiment, the video decoding apparatus 100 may determine whether a plurality of coding units determined when a current coding unit is split have certain split shapes based on values of PID. Referring to FIG. 21, the video decoding apparatus 100 may determine the even number of second coding units 2112*a* and 211*b* or the odd number of second coding units 2114*a* through 2114*c* by splitting the first coding unit 2110 having a rectangular shape in which the height is longer than the width. The video decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the video decoding apparatus 100 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the video decoding apparatus 100 may split the first coding unit 2110 into the three second coding units 2114*a* through 2114*c*. The video decoding apparatus 100 may assign a PID to each of the three second coding units 2114*a* through 2114*c*. The video decoding apparatus 100 may compare PIDs of an odd number of coding units so as to determine a center coding unit from among the coding units. The video decoding apparatus 100 may determine, as a coding unit at a center location from among coding units determined when the first coding unit 2110 is split, the second coding unit 2114*b* having a PID corresponding to a center value from among PIDs, based on PIDs of the coding units. According to an embodiment, while determining PIDs for distinguishing coding units, when the coding units do not have the same sizes, the video decoding apparatus 100 may determine PIDs based on a size ratio of the coding units. Referring to FIG. 21, the second coding unit 2114*b* generated when the first coding unit 2110 is split may have the same width as the second coding units 2114*a* and 2114*c*, but may have a height twice higher than those of the second coding units 2114*a* and 2114*c*. In this case, when the PID of the second coding unit 2114*b* located at the center is 1, the PID of the second coding unit 2114*c* in a next order may be 3, the PID having increased by 2. As such, when an increasing range of PIDs differs while uniformly increasing, the video decoding apparatus 100 may determine that a current coding unit is split into a plurality of coding units including a coding unit having a different size from other coding units. According to an embodiment, when split shape information indicates splitting into an odd number of coding units, the video decoding apparatus 100 may split a current coding unit into a plurality of coding units, in which a coding unit at a certain location (for example, a center coding unit) has a size different from other coding units. In this case, the video decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the video decoding apparatus 100 may use a certain data unit from which recursive splitting of a coding unit is started.

Figure 22:
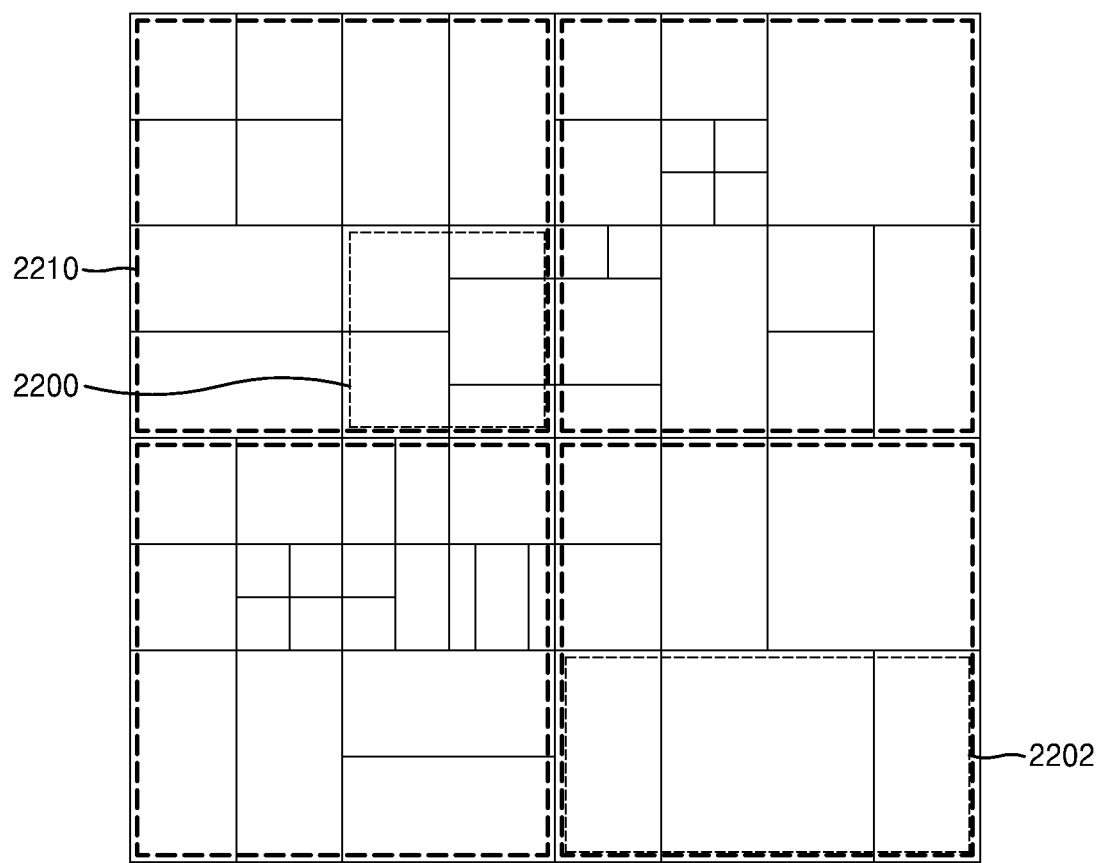
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the video decoding apparatus 100 may split a current picture into a plurality of reference data units. According to an embodiment, the video decoding apparatus 100 may split the plurality of reference data units obtained by splitting the current picture by using split shape information about each of the reference data units. Split processes of such reference data units may correspond to split processes using a quad-tree structure.

According to an embodiment, the video decoding apparatus 100 may pre-determine a smallest size available for the reference data unit included in the current picture. Accordingly, the video decoding apparatus 100 may determine the reference data unit having various sizes that are equal to or larger than the smallest size, and determine at least one coding unit based on the determined reference data unit by using block shape information and split shape information.

Referring to FIG. 22, the video decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the video decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the video decoding apparatus 100 may use a PID for distinguishing the size and shape of the reference coding unit. In other words, the video decoding apparatus 100 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The video decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the video decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the video decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the video decoding apparatus 100 may determine a reference coding unit by splitting a largest coding unit n times according to a quad-tree structure, and split the reference coding unit based on at least one of block shape information and split shape information according to various embodiments.

Figure 23:
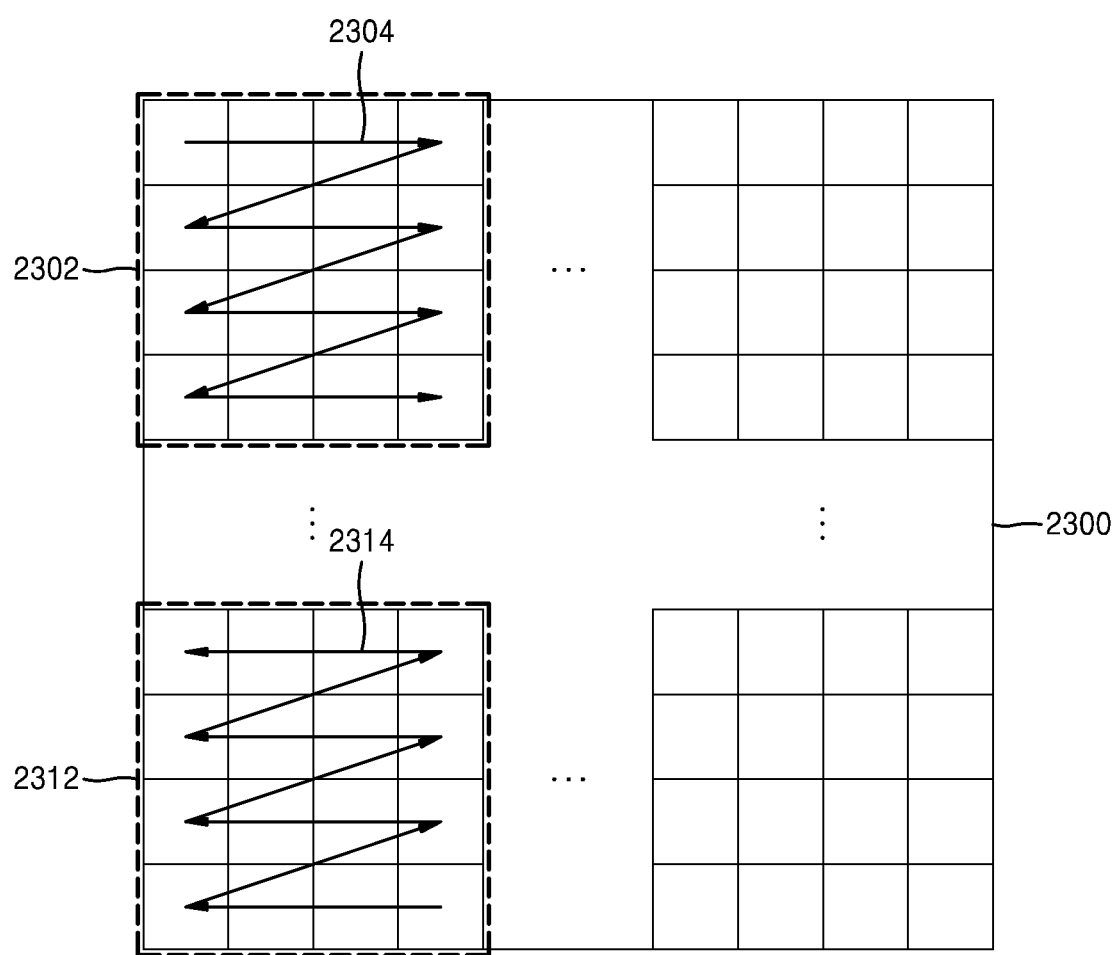
FIG. 23 illustrates a processing block serving as a criterion of determining a determination order of reference coding unit included in a picture, according to an embodiment.

FIG. 23 illustrates a processing block serving as a criterion of determining a determination order of a reference coding unit included in a picture 2300, according to an embodiment.

According to an embodiment, the video decoding apparatus 100 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the video decoding apparatus 100 may determine a size of at least one processing block included in an image by obtaining information about a size of a processing block. The video decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the video decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the video decoding apparatus 100 may obtain, from the bitstream, the information about a size of a processing block according to such several data units, and the video decoding apparatus 100 may determine the size of at least one processing block splitting the picture by using the obtained information about a size of a processing block, wherein the size of the processing block may be an integer times a size of a reference coding unit.

According to an embodiment, the video decoding apparatus 100 may determine sizes of processing blocks 2302 and 2312 included in the picture 2300. For example, the video decoding apparatus 100 may determine a size of a processing block based on information about a size of a processing block, the information being obtained from a bitstream. Referring to FIG. 23, the video decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The video decoding apparatus 100 may determine a determining order of at least one reference coding unit in at least one processing block.

According to an embodiment, the video decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the video decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the video decoding apparatus 100 may obtain, from a bitstream, information about a determining order of a reference coding unit according to certain data units. For example, the video decoding apparatus 100 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the video decoding apparatus 100 may determine at least one reference coding unit based on the determined order.

According to an embodiment, the video decoding apparatus 100 may obtain, from the bitstream, information about a determining order of a reference coding unit, as information related to the processing blocks 2302 and 2312, and the video decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the video decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The video decoding apparatus 100 may decode determined at least one reference coding unit, according to an embodiment. The video decoding apparatus 100 may decode an image based on reference coding units determined through above embodiments. Examples of a method of decoding a reference coding unit may include various methods of decoding an image.

According to an embodiment, the video decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the video decoding apparatus 100 may use the block shape information or split shape information, which is included in a sequence parameter set, a picture parameter set, a video parameter set, a slice header, and a slice segment header. In addition, the video decoding apparatus 100 may obtain, from a bitstream, and use syntax corresponding to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A video decoding method comprising:
   decoding a video bitstream to obtain a prediction mode flag;
   when the prediction mode flag indicates a prediction mode according to an inter prediction mode, parsing a skip flag from the video bitstream and determining whether an inter prediction mode of a current block is a skip mode;
   when the inter prediction mode of the current block is determined not to be the skip mode from the skip flag, parsing a merge flag from the video bitstream and determining whether the inter prediction mode of the current block is a merge mode;
   when the inter prediction mode of the current block is the merge mode, acquiring, from the video bitstream, intra merge information indicating whether it is possible to include an intra merge candidate in a merge candidate list;
   when it is possible to include the intra merge candidate in the merge candidate list, determining the merge candidate list including one or more intra merge candidates and one or more inter merge candidates of the current block;

when it is not possible to include the intra merge candidate in the merge candidate list, only include the one or more inter merge candidates in the merge candidate list;

generating prediction samples of the current block by using a prediction candidate selected from the determined merge candidate list; and reconstructing the current block by using the prediction samples of the current block and residual samples of the current block, wherein an inter merge candidate from among the one or more inter merge candidates is a prediction block determined by motion information of at least one block selected from among a neighboring block spatially adjacent to the current block and a collocated block located corresponding to a position of the current block in a picture temporally adjacent to the current block, the motion information including a prediction direction, a reference index, and a motion vector, and an intra merge candidate from among the one or more intra merge candidates is a prediction block including samples predicted by using neighboring samples spatially adjacent to the current block.

2. The video decoding method of claim 1, wherein the determining of the merge candidate list comprises determining, as an inter-intra merge candidate, a prediction block including samples determined using a weighted average of a prediction sample value according to the inter merge candidate from among the one or more inter merge candidates and a prediction sample value according to the intra merge candidate from among the one or more intra merge candidates.

3. The video decoding method of claim 1, wherein the determining of the merge candidate list including the one or more inter merge candidates and the one or more intra merge candidates of the current block comprises:

determining an inter merge candidate list including the one or more inter merge candidates; and determining an intra merge candidate list including the one or more intra merge candidates, and the generating of the prediction samples of the current block by using the prediction candidate selected from the determined merge candidate list comprises generating the prediction samples of the current block by using prediction candidates selected from the inter merge candidate list and the intra merge candidate list.

4. The video decoding method of claim 1, wherein the determining of the merge candidate list including the one or more inter merge candidates and the one or more intra merge candidates of the current block comprises determining one merge candidate list including at least one inter merge candidate and at least one intra merge candidate.

5. The video decoding method of claim 1, further comprising determining a merge candidate list not including the one or more intra merge candidates of the current block when the neighboring samples spatially adjacent to the current block cannot be included in the merge candidate list according to the intra merge information.

6. The video decoding method of claim 1, wherein the determining of the merge candidate list comprises determining the one or more intra merge candidates by using a predetermined number of neighboring samples spatially adjacent to the current block in a predetermined direction.

7. The video decoding method of claim 1, wherein the determining of the merge candidate list comprises determining the one or more intra merge candidates by using a predetermined number of neighboring samples adjacent in a predetermined direction and determined from a direction indicated by a most probable mode (MPM) index acquired from the video bitstream.

8. The video decoding method of claim 1, wherein the generating of the prediction samples of the current block by using the prediction candidate selected from the determined merge candidate list comprises:

acquiring, from the video bitstream, a merge candidate index indicating one candidate in the merge candidate list; and generating prediction samples of the current block by using the one candidate indicated by the merge candidate index in the determined merge candidate list.

9. A video decoding apparatus comprising:

a merge candidate list determiner configured to:

decode a video bitstream to obtain a prediction mode flag, when the prediction mode flag indicates a prediction mode according to an inter prediction mode, parse a skip flag from the video bitstream and determine whether an inter prediction mode of a current block is a skip mode, when the inter prediction mode of the current block is determined not to be the skip mode from the skip flag, parse a merge flag from the video bitstream and determine whether the inter prediction mode of the current block is a merge mode, when the inter prediction mode of the current block is the merge mode, acquire, from the video bitstream, intra merge information indicating whether it is possible to include an intra merge candidate in a merge candidate list, when it is possible to include the intra merge candidate in the merge candidate list, determine a merge candidate list including one or more intra merge candidates and one or more inter merge candidates of the current block, and when it is not possible to include the intra merge candidate in the merge candidate list, only include the one or more inter merge candidates in the merge candidate list; and a decoder configured to generate prediction samples of the current block by using a prediction candidate selected from the determined merge candidate list, and reconstruct the current block by using the prediction samples of the current block and residual samples of the current block, wherein an inter merge candidate from among the one or more inter merge candidates is a prediction block determined by motion information of at least one block selected from among a neighboring block spatially adjacent to the current block and a collocated block located corresponding to a position of the current block in a picture temporally adjacent to the current block, the motion information including a prediction direction, a reference index, and a motion vector, and an intra merge candidate from among the one or more intra merge candidates is a prediction block including samples predicted by using neighboring samples spatially adjacent to the current block.

10. The video decoding apparatus of claim 9, wherein the merge candidate list determiner is further configured to determine, as an inter-intra merge candidate, a prediction block including samples determined using a weighted average of a sample value of the inter merge candidate and a sample value of at least one intra merge candidate.

11. The video decoding apparatus of claim 9, wherein the merge candidate list determiner is further configured to determine an inter merge candidate list including the one or more inter merge candidates, and determine an intra merge candidate list including the one or more intra merge candidates, and the decoder is further configured to generate the prediction samples of the current block by using prediction candidates selected from the inter merge candidate list and the intra merge candidate list.

12. A video encoding method comprising:

determine an inter prediction mode of a current block as one of a skip mode and a merge mode;

when an intra merge candidate is included in a merge candidate list, determining the merge candidate list including one or more intra merge candidates and one or more inter merge candidates of the current block;

when the intra merge candidate is not included in the merge candidate list, only including the one or more inter merge candidates in the merge candidate list;

generating intra merge information indicating whether it is possible to include the intra merge candidate in the merge candidate list;

generating a merge candidate index indicating a prediction candidate selected for generating prediction samples of the current block in the determined merge candidate list; and encoding residual samples between the current block and the prediction samples of the current block and the merge candidate index, and generating a video bitstream including the intra merge information, the encoded residual samples the merge candidate index, a prediction mode flag indicating whether a prediction mode of the current block is the inter prediction mode or an intra prediction mode, wherein an inter merge candidate from among the one or more inter merge candidates is a prediction block determined by motion information of at least one block selected from among a neighboring block spatially adjacent to the current block and a collocated block located corresponding to a position of the current block in a picture temporally adjacent to the current block, the motion information including a prediction direction, a reference index, and a motion vector, and an intra merge candidate from among the one or more intra merge candidates is a prediction block including samples predicted by using neighboring samples spatially adjacent to the current block.

13. The video encoding method of claim 12, wherein a prediction block including samples determined using a weighted average of a sample value of the inter merge candidate from among the one or more inter merge candidates and a sample value of the intra merge candidate from among the one or more intra merge candidates is determined as an inter-intra merge candidate.

\* \* \* \* \*